United States Patent
Devaraj et al.

(10) Patent No.: US 11,968,271 B2
(45) Date of Patent: *Apr. 23, 2024

(54) SENDER AND RECIPIENT DISAMBIGUATION

(71) Applicant: Amazon Technologies, Inc., Seattle, WA (US)

(72) Inventors: Christo Frank Devaraj, Seattle, WA (US); Christopher Geiger Parker, Seattle, WA (US); Sumedha Arvind Kshirsagar, Seattle, WA (US); James Alexander Stanton, Seattle, WA (US); Aaron Takayanagi Barnet, Seattle, WA (US); Venkatesh Kancharla, Chennai (IN); Gregory Michael Hart, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,974

(22) Filed: Dec. 28, 2022

(65) Prior Publication Data

US 2023/0216927 A1    Jul. 6, 2023

Related U.S. Application Data

(63) Continuation of application No. 17/101,662, filed on Nov. 23, 2020, now Pat. No. 11,546,434, which is a
(Continued)

(51) Int. Cl.
*H04B 1/38* (2015.01)
*G06Q 10/10* (2023.01)
(Continued)

(52) U.S. Cl.
CPC ........... *H04L 67/306* (2013.01); *G06Q 10/10* (2013.01); *H04M 1/72433* (2021.01);
(Continued)

(58) Field of Classification Search
CPC ..... G10L 13/00; G10L 15/02; G10L 15/1815; G10L 15/22; H04L 67/306; H04M 1/72547; H04W 4/80
See application file for complete search history.

(56) References Cited

U.S. PATENT DOCUMENTS 9,318,104 B1 * 4/2016 Fructuoso ............... H04M 1/00
9,484,030 B1   11/2016 Meaney et al.
(Continued)

FOREIGN PATENT DOCUMENTS

WO    WO2016054230    4/2016

OTHER PUBLICATIONS

Fitzpatrick, How to Inviye a Household Member to Share Your Amazon Echo?, Dec. 21, 2015, Retrieved from the Internet: URL: https://www.howtogeek.com/237073/how-ta-invite-a-household-member-to-share-youramazon-echo/ , p. 2-3.
(Continued)

Primary Examiner — Xin Jia
(74) Attorney, Agent, or Firm — Lee & Hayes, P.C.

(57) ABSTRACT

Systems and methods for sender profile and/or recipient profile disambiguation and/or confirmation are disclosed. In instances where a sender profile is not indicated by a user sending a communication from a communal device, heuristic data may be utilized to infer the sender profile. Similar heuristic data may also be used when selection of the sender profile is associated with a low confidence level. Heuristic data may also be used to infer the recipient profile when the user does not indicate the recipient profile or when selection of the recipient profile is associated with a low confidence.
(Continued)

Various confirmations may result from the sender and recipient profile disambiguation.

20 Claims, 10 Drawing Sheets

Related U.S. Application Data continuation of application No. 15/616,713, filed on Jun. 7, 2017, now Pat. No. 10,848,591.

(60) Provisional application No. 62/489,911, filed on Apr. 25, 2017.

(51) Int. Cl.

| | | |
|---|---|---|
| *H04L 67/306* | (2022.01) | |
| *H04M 1/72433* | (2021.01) | |
| *H04M 3/42* | (2006.01) | |
| *H04M 3/533* | (2006.01) | |
| *G10L 15/26* | (2006.01) | |
| *H04W 4/80* | (2018.01) | |

(52) U.S. Cl.
CPC ... *H04M 3/42238* (2013.01); *H04M 3/53366* (2013.01); *G10L 15/26* (2013.01); *H04M 2203/556* (2013.01); *H04M 2250/74* (2013.01); *H04W 4/80* (2018.02)

(56) References Cited

U.S. PATENT DOCUMENTS

| | | | | |
|---|---|---|---|---|
| 9,973,627 | B1* | 5/2018 | Allison | ............. H04M 1/72478 |
| 2014/0236598 | A1* | 8/2014 | Fructuoso | ............... G10L 15/02 |
| | | | | 704/249 |
| 2014/0249817 | A1 | 9/2014 | Hart et al. | |
| 2017/0104958 | A1* | 4/2017 | Farrell | .................. A63F 13/352 |
| 2018/0007210 | A1* | 1/2018 | Todasco | ............ H04M 3/53366 |
| 2018/0061419 | A1* | 3/2018 | Melendo Casado | .... G10L 25/78 |
| 2018/0309866 | A1 | 10/2018 | Devaraj et al. | |
| 2021/0144230 | A1 | 5/2021 | Devaraj et al. | |

OTHER PUBLICATIONS

Kinsella, "Quick User Guide for Amazon Alexa Calling and Messaging—Voi/quick-user-guide-for-amazon-alexa", May 14, 2017, Retrieved from: https://voicebot.ai/2017/05/14/quick-user-guide-for-amazon-alexa-calling-and-messaging/, pp. 1-8.

Final Office Action dated Mar. 7, 2019 for U.S. Appl. No. 15/616,713 "Sender and Recipient Disambiguation" Devaraj, 16 pages.

Office Action for U.S. Appl. No. 15/616,713, dated Mar. 10, 2020, Devaraj, "Sender and Recipient Disambiguation", 24 Pages.

Office Action for U.S. Appl. No. 15/616,713, dated Nov. 5, 2018, Devaraj et al., "Sender and Recipient Disambiguation", 16 pages.

Final Office Action dated Nov. 6, 2019 for U.S. Appl. No. 15/616,713 "Sender and Recipient Disambiguation" Devaraj, 25 pages.

Office Action for U.S. Appl. No. 15/616,713, dated Jun. 20, 2019, Devaraj, "Sender and Recipient Disambiguation", 16 pages.

PCT Search Report and Written Opinion dated Jun. 21, 2018, for PCT Application No. PCT/US18/28412, 13 pages.

Varma, "Send Twilio Voice or Text messages using Amazon Echo", Mar. 27, 2016, Retrieved from: https://www.hackster.io/krvarma/send-twilio-voice-or-text-messages-using-amazonecho-ecbf a9 , 14 pages.

* cited by examiner

SENDER AND RECIPIENT DISAMBIGUATION

CROSS REFERENCE TO RELATED APPLICATION

This application claims priority to and is a continuation of U.S. patent application Ser. No. 17/101,662, filed on Nov. 23, 2020, which will issue as U.S. Pat. No. 11,546,434 on Jan. 3, 2023, which claims priority to and is a continuation of U.S. patent application Ser. No. 15/616,713, filed on Jun. 7, 2017, now known as U.S. Pat. No. 10,848,591, which issued on Nov. 24, 2020, which claims the benefit of U.S. Provisional Application No. 62/489,911, entitled "Sender and Recipient Disambiguation," filed on Apr. 25, 2017, the entirety of which is incorporated by reference herein.

BACKGROUND

Communications may be sent from one user profile to another. One user profile is designated as the sender and another user profile is designated as the recipient. The sender user profile is generally defaulted while the recipient's user profile is selected by a sender. Described herein are improvements in technology that will improve, among other things, the user experience when using a voice user interface and/or communal device to send message.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
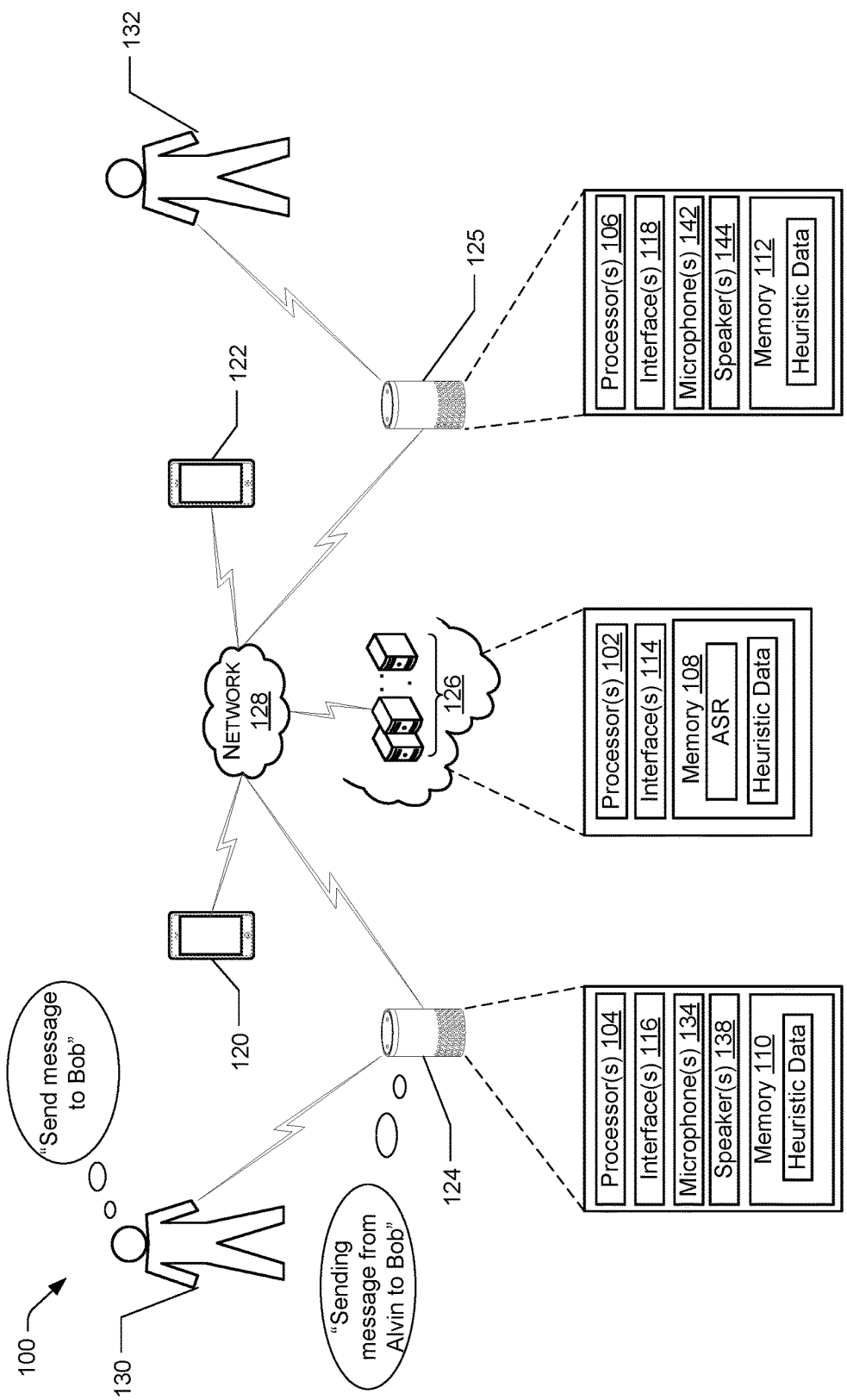
FIG. 1 illustrates a schematic diagram of an example system for disambiguating and/or confirming sender and recipient profiles.

Systems and methods for sender and recipient disambiguation and confirmation are described herein. Users may interact with communal devices and personal mobile devices to send and receive communications, such as messages and calls. When sending a communication with a communal device, such as a voice-assistant device, it may be difficult to determine which sender profile to send the communication from and which recipient profile to send the communication to. Take, for example, a communal device that has one or more user profiles and/or user accounts associated with the communal device. A user, Alvin, may desire to send a communication to, for example, Bob. Alvin may provide a command, such as an audible command, to the communal device to "send a message to Bob." The communal device, through automatic speech recognition and natural language understanding techniques, may determine from audio data corresponding to the audible command that a command has been given to send a communication and that the communication should be sent to a user profile associated with Bob. However, because Alvin's command did not include an indication that the communication should be sent from Alvin, one or more heuristics may be used to intuitively determine which user profile to send the communication from.

For example, in one heuristic, which may be described as heuristic data, a user profile associated with Alvin may be identified as the sender profile based at least in part on Alvin's user profile being the only user profile associated with the communal device. In this example, since the only sender profile option is Alvin's user profile, that user profile may be set as the sender profile. Utilizing other example heuristic data, a user profile associated with Alvin may be identified as the sender profile based at least in part on Alvin's user profile and Bob's user profile being the only user profiles associated with the communal device and/or a communal account. In this example, since Bob is indicated as the recipient, his user profile may not be available as a sender profile, making Alvin's user profile the only available user profile to set as the sender profile.

In yet another example, heuristic data may be utilized to determine that Alvin's user profile may be identified as the sender profile based at least in part on a determination that Bob is a contact name in only Alvin's contact list. In this example, there may be multiple user profiles, including Alvin's user profile, that are associated with the communal device. Each of the multiple user profiles may be associated with their own respective contact list, which may include contact information, including name designations, for one or more contacts that the users communicate with. If Bob is a contact name in only Alvin's contact list, then Alvin's user profile may be set as the sender profile.

In instances where one or more of the example heuristic data described above fail to identify the sender profile, or when the sender profile is identified with low confidence, additional heuristic data may be utilized. For example, the communal device may query the user for a name that corresponds to the sender profile. Upon receiving audio including the name, the name may be compared with one or more user profiles that are available as the sender profile. A confidence level may be associated with the one or more user profiles and a series of confirmation and/or disambiguation steps may be performed. For example, if there is a low confidence that the selected user profile should be set to the sender profile, the communal device may query the user to provide the name again. If the user's second response does not produce a mid to high confidence selection, the sender profile may be set to a communal profile, which may be described as a home group profile.

If the user's second response, or initial response, produces a mid to high confidence selection, entity recognition may be performed to determine if the provided name matches at least one user profile associated with the communal device. If only low relevance matches are identified, the communal device and/or a remote system may determine that the user's request does not match a registered user profile. In this example, the sender profile may be set to the communal profile, or the communal device may query the user to select from a list of user profiles associated with the communal device.

If one or more mid to high relevance matches are identified, the communal device and/or the remote system may utilize one or more rules to determine the sender profile. For example, if only one matching profile is identified with high relevance, the sender profile may be set to that matching profile. If only one matching profile is identified with mid relevance, the communal device may output a confirmation that the matching profile is being set as the sender profile, and the communal device may provide the user with an opportunity correct the selected sender profile. If the user responds by stating that the selected profile is not accurate, the communal device may query the user for the name again, and the process may start over. If the user responds by confirming the selected profile, that profile may be set as the sender profile.

If multiple mid to high relevance matches are identified, the number of such matches may be determined. If the number of matches is a small number, such as, for example, two or three matches, the communal device may query the user to select between the two or three matching profiles. The sender profile may then be set to the profile selected by the user. If the number of matches is not a small number, such as, for example, four or more matches, the communal device may query the user to provide the name again and that name may be compared to the four or more matches to determine the sender profile.

The application and/or the remote system described herein may provide a range of additional, or alternative, functionalities to users. These functionalities may include disambiguating and/or confirming a recipient profile, including when no recipient profile is identified in the user's command to send a communication. The functionalities may also include providing implicit and explicit confirmations given the results of utilizing the heuristic data described herein. Providing implicit confirmation may make the user's communication sending experience more intuitive and easier to establish. The functionalities may also include dynamically determining the order for disambiguation and/or confirmation of sender and recipient profiles. For example, given certain confidence levels for setting the sender and/or recipient profiles, certain disambiguation and/or confirmation steps may be skipped or delayed, such as when the content of message data provided by the user is utilized to inform the selection of the sender and/or recipient profile. The functionalities may also include utilizing additional information to set the sender and/or recipient profiles. The additional information may include, for example, historical communication data for communications between user profiles, default settings, timing data indicating that a communication is likely in response to a previous communication, time of day and/or day of week data, scheduling data, familial relationship data, placement of the communal device in an environment such as a home, and detection of user-specific trigger expressions, for example.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for message grouping. System 100 may include one or more processors. As used herein, a processor, such as processor(s) 102, 104, and/or 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 102, 104, and/or 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 102, 104, and/or 106 may possess its own local memory, which also may store program components, program data, and/or one or more operating systems.

System 100 may also include memory 108, 110, and/or 112. Memory 108, memory 110, and memory 112 may include volatile and nonvolatile memory, removable and non-removable media implemented in any method or technology for storage of information, such as computer-readable instructions, data structures, program component, or other data. Such memory 108, 110, and/or 112 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 108, 110, and/or 112 may be implemented as computer-readable storage media ("CRSM"), which may be any available physical media accessible by the processor(s) 102, 104, and/or 106 to execute instructions stored on the memory 108, 110, and/or 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 108, 110, and/or 112, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Each of the network interface(s) 114, network interface(s) 116, and network interface(s) 118 may enable communications between a first device 120, a second device 122, a third device 124, a fourth device 125, and a remote system 126, as well as other networked devices. Such network interface(s) can include one or more network interface controllers (NICs) or other types of transceiver devices to send and receive communications over a network.

For instance, each of the network interface(s) 114, network interface(s) 116, and network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 114, network interface(s) 116, and network interface(s) 118 may include a wide area network (WAN) component to enable communication over a wide area network. The network 128 may represent an array of wired networks, wireless networks, such as WiFi, or combinations thereof.

In some instances, the remote system 126 may be local to an environment associated the first device 120, the second device 122, the third device 124, and/or the fourth device 125. For instance, the remote system 126 can be located within the third device 124 and/or the fourth device 125. In some instances, some or all of the functionality of the remote system 126 may be performed by one or more of the first device 120, the second device 122, the third device 124, or the fourth device 125.

In some instances, the remote system 126 is configured to store information indicating that one or more user profiles are associated with a communal device, such as the third device 124. The one or more user profiles may be registered with the communal device 124 and/or may be associated with a user account that is registered with the communal device 124. In examples, the user profiles that are associated with the communal device may correspond to members of a family and/or a group of users that reside in the same environment, such as a home. The remote system 126 may also be configured to store and/or access one or more contact lists that correspond respectively to the one or more user profiles. Each of the multiple user profiles may be associated with their own respective contact list, which may include contact information, including name designations, for one or more contact names that the user communicates with. By way of example, the contact information for a contact name associated with the contact lists may include a name and/or nickname of a person corresponding to the contact name, one or more telephone numbers, and/or one or more devices that the contact name is associated with, including communal devices, for example. A contact name may be identified on only one contact list associated with one user profile of the communal device 124, or the contact name may be identified on multiple contact lists associated with multiple user profiles of the communal device 124. When the contact is identified on multiple contact lists, the contact information associated with that contact name may differ. For example, the name of the contact may be "Nick" in a first user profile's contact list while the name may be "Nicholas" in a second user profile's contact list. These differences may be utilized when performing sender and/or recipient disambiguation as described herein.

The remote system 126 may be further configured to receive, from the communal device 124, audio data corresponding to user speech from a user, such as the user 130. The user 130 may speak, and that user speech may be captured by one or more microphones 134 of the communal device 124. The one or more microphones 134 may generate audio data corresponding to the audio. The remote system 126 may generate text data corresponding to the audio data using, for example, automatic speech recognition techniques, as described more fully with respect to FIG. 9. The remote system 126 may then determine, from the text data, an intent to send a communication such as message data. Determining the intent may be performing using natural language understanding techniques as described with respect to FIG. 9.

In examples, along with determining that the user 130 intends to send a communication, the remote system 126 may also determine a sender profile and/or a recipient profile to associate with the communication. For example, the user 130 may say "send a message to Bob." In this example, the remote system 126 may analyze the text data corresponding ultimately to this statement by the user 130 to determine (1) that the user intends to send message data, and (2) that the recipient profile for the message data is associated with "Bob." In some instances, Bob may be associated with one user profile and that user profile may be selected as the recipient profile. The remote system 126 may also determine that the audio data and/or the text data does not include an indication of a sender profile to associate with the message data. In these examples, the remote system 126 may utilize heuristic data to infer which sender profile to associate with the message data. For example, the user 130 may be a person named Alvin. Alvin may be associated with a first user profile, such as Alvin's user profile. The remote system 126 may determine that Alvin's user profile should be used as the sender profile based at least in part on the following heuristic data: (1) the information stored by the remote system 126 indicates that only one user profile, Alvin's user profile, is associated with the communal device 124; (2) the information stored by the remote system 126 indicates that only two user profiles, Alvin's and Bob's user profiles, for example, are associated with the communal device 124 and Bob's user profile is set as the recipient profile; and/or (3) the information stored by the remote system 126 indicates that contact information related to the recipient profile is identified for only the contact list associated with Alvin's user profile.

If the heuristic data described above does not result in identifying the sender profile, additional processes may be performed. For example, the communal device 124 may query the user 130 for a name that corresponds to the sender profile. A confidence level may be associated with the provided name and a series of confirmation and/or disambiguation steps may be performed. For example, if there is a low confidence that the name identified by the remote system 126 corresponds to the name provided by the user 130, the communal device 124 may query the user 130 to provide the name again. If the user's second response does not produce a mid to high confidence result, the sender profile may be set to a communal profile, which may be described as a home group profile. In other examples, the request to send a message may be canceled or otherwise not fulfilled.

If the user's second response produces a mid to high confidence selection, or the user's initial provision of the name produces a mid to high confidence selection, entity recognition may be performed to determine if the provided name matches at least one user profile associated with the communal device 124. If only low relevance matches are identified, the communal device 124 and/or the remote system 126 may determine that the user's request does not match a registered and/or associated user profile. In this example, the sender profile may be set to the communal profile, or the communal device 124 may query the user 130 to select from a list of user profiles associated with the communal device 124.

If one or more mid to high relevance matches are identified, the communal device 124 and/or the remote system 126 may utilize heuristic data to determine the sender profile. For example, if only one matching profile is identified with high relevance, the sender profile may be set to that matching profile. If only one matching profile is identified with mid relevance, the communal device 124 may output a confirmation that the matching profile is being set as the sender profile, and the communal device 124 may provide the user 130 with an opportunity to correct the selected sender profile. If the user 130 responds by stating that the selected profile is not accurate, the communal device 124 may query the user 130 for the name again, and the process may start over. If the user 130 responds by confirming the selected profile, that profile may be set as the sender profile.

If multiple mid to high relevance matches are identified, the number of such matches may be determined. If the number of matches is a small number, such as, for example, two or three matches, the communal device 124 may query the user 130 to select between the two or three matching profiles. The sender profile may then be set to the profile selected by the user 130. If the number of matches is not a small number, such as, for example, four or more matches, the communal device 124 may query the user 130 to provide the name again and that name may be compared to the four or more matches to determine the sender profile.

The remote system 126, once the sender profile and the recipient profile are set, may cause the communal device 124 to query the user 130 for the message to be sent. One or more microphones 134 of the communal device 124 may capture audio representing the message from the user 130 and may generate audio data corresponding to the audio. The audio data may be received by the remote system 126 and may be sent from the sender profile to the recipient profile. Additionally, or alternatively, text data representing a transcription of the audio data may be generated and may be sent to one or more devices associated with the recipient profile and/or one or more devices associated with the sender profile.

In examples where the recipient profile is identified as a communal profile, such as a home group profile associated with the communal device, then the sender profile may also be identified as the communal profile. Setting the sender profile and the recipient profile as such may allow for a group communication to occur between the members of the communal profile, such as family members and/or user residing in the same environment, such as a home.

The sent message data may be displayed on devices associated with the sender profile, such as the first device 120, and/or on devices associated with the recipient profile, such as the second device 122. Audio corresponding to the message data may additionally, or alternatively, be output by one or more speakers 138 of the communal device 124 and/or the mobile device 120 associated with the sending user 130, and/or by one or more speakers 144 of the communal device 125 and/or the mobile device 122 associated with the recipient user 132. In addition to outputting the message data, audio may be output corresponding to a statement as to who the message data is from.

Additional message data may be received and sent between the first device 120, the second device 122, the third device 124, the fourth device 125, and one or more other devices associated with the first user 130 and/or the second user 132. Audio message data may be sent by the second user 132 in response to the message data from the first user 130, such as by one or more microphones 142 associated with the fourth device 125.

Additionally, or alternatively, the memory 110 on the communal device 124 may, when executed by the processor(s) 104, cause the processor(s) 104 to perform operations similar to those described above with respect to the remote system 126. For example, the communal device 124 may be configured to store information indicating that one or more user profiles are associated with the communal device 124. The one or more user profiles may be registered with the communal device 124 and/or may be associated with a user account that is registered with the communal device 124. In examples, the user profiles that are associated with the communal device 124 may correspond to members of a family and/or a group of users that reside in the same environment, such as a home. The communal device 124 may also be configured to store and/or access one or more contact lists that correspond respectively to the one or more user profiles.

The communal device 124 may be further configured to receive audio data corresponding to user speech from a user, such as the user 130. The user 130 may speak, and that user speech may be captured by one or more microphones 134 of the communal device 124. The one or more microphones 134 may generate audio data corresponding to the user speech. The communal device 124 may generate text data corresponding to the audio data using, for example, automatic speech recognition techniques, as described more fully with respect to FIG. 9. The communal device 124 may then determine, from the text data, an intent to send a communication such as message data. Determining the intent may be performing using natural language understanding techniques as described with respect to FIG. 9. In other examples, the communal device 124 may send the audio data to a remote system, such as remote system 126, which may perform the automatic speech recognition and natural language understanding techniques described herein.

In examples, along with determining that the user 130 intends to send a communication, the communal device 124 and/or the remote system 126 may also determine a sender profile and/or a recipient profile to associate with the communication. For example, the user 130 may say "send a message to Bob." In this example, the communal device 124 and/or the remote system 126 may analyze the text data corresponding ultimately to this statement by the user 130 to determine (1) that the user intends to send message data, and (2) that the recipient profile for the message data is associated with "Bob." In some instances, Bob may be associated with one user profile and that user profile may be selected as the recipient profile. The communal device 124 and/or remote system 126 may also determine that the text data does not include an indication of a sender profile to associate with the message data. In these examples, the communal device 124 and/or remote system 126 may utilize the heuristic data described herein to infer which sender profile to associate with the message data.

The communal device 124 and/or the remote system 126, once the sender profile and the recipient profile are set, may cause the communal device 124 to query the user 130 for the message to be sent. One or more microphones 134 of the communal device 124 may capture audio representing the message from the user 130 and may generate audio data corresponding to the audio. The audio data may be received by the remote system 126 and may be sent from the sender profile to the recipient profile. Additionally, or alternatively, text data representing a transcription of the audio data may be generated and may be sent to one or more devices associated with the recipient profile and/or one or more devices associated with the sender profile.

In addition to the operations described above, voice recognition techniques may also be utilized to assist in sender profile disambiguation and confirmation. For example, voice recognition techniques may be used to determine which user is speaking to the communal device. These techniques may include comparing prosodic characteristics of the user speech, such as pitch, loudness, tempo, rhythm, and intonation, for example, with stored data indicating prosodic characteristics of associated with user of the communal device. In some examples, a hierarchy of heuristic data may be utilized to disambiguate and confirm a sender profile. For example, voice recognition techniques may first be utilized. If the voice recognition techniques do not identify a sender profile, or if the sender profile is identified with a low confidence, then the heuristic data described herein may be utilized. If the heuristic data also fail to identify the sender profile above a threshold confidence level, explicit confirmation may be utilized, which may involve asking the user to provide the sender profile and explicitly confirm that the selected profile is accurate. In examples, the voice recognition techniques described herein may allow any user associated with any communal device of a similar type as the communal devices described herein to request a message to be sent from other communal devices, even if the user is not registered with the particular communal device being used. Other techniques may additionally, or alternatively, be used such as, for example, utilizing biometric information, which may include facial recognition and fingerprint detected on a touch surface. Communications with user-specific devices may also be utilized, such as, for example, a user's smart watch, cell phone, or fitness tracking device.

Figure 2:
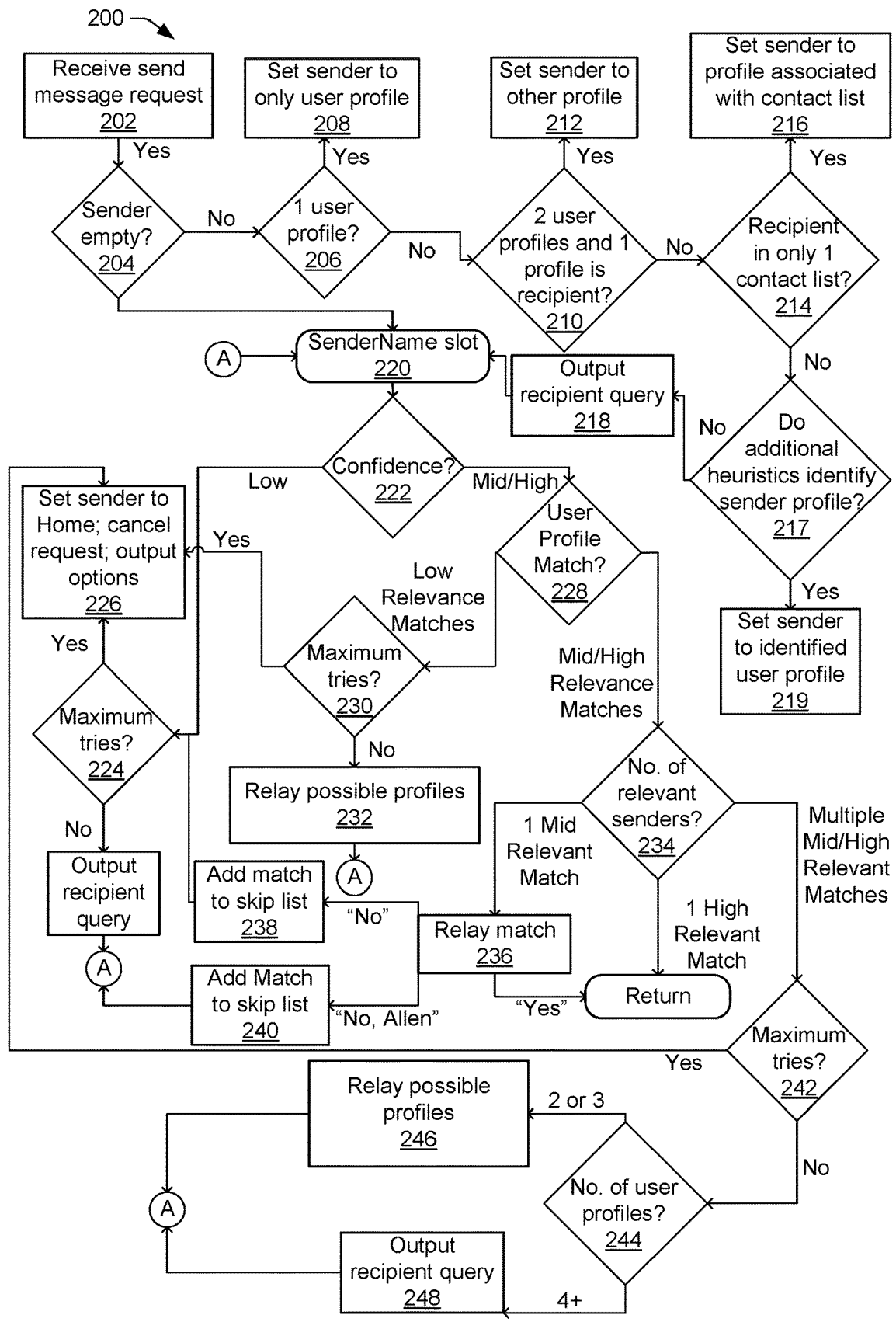
FIG. 2 illustrates a flow diagram of an example process for disambiguating and/or confirming sender profiles.

FIG. 2 illustrates a flow diagram of an example process 200 for disambiguating and/or confirming sender and recipient profiles. The order in which the operations or steps are described is not intended to be construed as a limitation, and any number of the described operations may be combined in any order and/or in parallel to implement process 200.

At block 202, process 200 may include receiving a request to send a communication, such as a message. As used throughout this disclosure, examples may be described where the request is to send message data. However, it should be understood that these examples also include a request to establish a communication channel, such as a telephone call and/or video call between two or more user profiles. The request may be sent from a user of a communal device, such as, for example, a voice-assistant device. The request may correspond to audio from the user that is captured by one or more microphones of the communal device. It should be understood that, while the examples used herein describe the user of a communal device, a personal device, such as, for example, a mobile phone, may also be utilized to perform the processes and methods described herein. The microphones may generate audio data corresponding to the audio, and that audio data may be analyzed using automatic speech recognition and natural language understanding techniques to determine a send-communication request by the user. The techniques described herein may also be used to determine that the user has provided an indication of the recipient profile to associate with the communication. As used throughout this disclosure, examples may describe the recipient profile as a single profile associated with a single user. However, the communications may additionally, or alternatively, be sent to multiple recipient profiles. Additionally, when messages and/or message data are described as being sent to and/or from a user, it should be appreciated that the messages and/or message data may be sent to one or more user profiles associated with a user and/or one or more user accounts associated with a user. A user may be associated with more than one account, and each account may be associated with multiple profiles. The user profiles and/or user accounts may be associated with devices of the user, such as, for example, phones, computers, tablets, and/or personal assistants. Additionally, or alternatively, the user profiles and/or user accounts may be associated with one or more applications, which may be stored on user devices and/or on a remote system. Additionally, or alternatively, multiple user accounts may be associated with a communal device or multiple profiles may be associated with a communal profile that is associated with a communal device. In the example shown in FIG. 2, the user may be named "Alvin," who is associated with Alvin's user profile, and the recipient may be named "Bob," who is associated with Bob's user profile.

At block 204, the process 200 may include determining whether a sender profile is indicated from the audio provided by the user. For example, the user may say "send a message from Alvin." In this example, "from Alvin" indicates the user's intent to send a message from a user profile associated with Alvin. It should be noted that while this example describes the word "from" as a key word indicating the user profile to set as the sender profile, other words and permutations may be used, such as "on behalf of," for example. In response to determining that a sender profile is indicated from the audio provided by the user, the process 200 may continue to block 220, described in more detail below. In response to determining that a sender profile is not indicated from the audio provided by the user, or that the sender indication is empty, the process may continue to block 206, where heuristic data for disambiguating the sender profile may be utilized.

At block 206, the process may include determining whether only one user profile is associated with the communal device. User profiles may be associated with the communal device by, for example, a user registering his/her user profile with the communal device, a user registering one or more personal devices with the communal device, with a personal device being associated with the user's profile, a user-configurable setting, user interaction with the communal device, and/or receiving a signal, at the communal device, that indicates one or more personal devices are within a threshold proximity, such as within a home, to the communal device, for example. If only one user profile is associated with the communal device, the process may continue to block 208, where the sender profile to be associated with the communication from may be set to the user profile associated with the communal device. A communication channel may then be established between the communal device and one or more devices associated with the recipient profile, and/or the sender may provide a message, such as an audio message, to be associated with the sender profile and the recipient profile. If more than one user profile is associated with the communal device, the process 200 may continue to block 210.

At block 210, the process may include determining whether two user profiles are associated with the communal device and whether one of the two user profiles corresponds to the recipient profile. If two user profiles are associated with the communal device and one of the two user profiles corresponds to the recipient profile, the process may continue to block 212, where the sender profile for sending the communication from may be set to the other of the two user profiles associated with the communal device. If more than two user profiles are associated with the communal device and/or one of the user profiles does not correspond to the recipient profile, the process may continue to block 214.

At block 214, the process 200 may include determining that multiple user profiles are associated with the communal device and that the recipient profile is associated with a contact name in a contact list associated with only one of the user profiles. For example, some or all of the user profiles associated with the communal device may be associated with a contact list, which may include contact information for contact names included in the contact list. The contact list may be maintained by the communal device, a remote system that is accessible to the communal device, or a personal device accessible to the communal device. The contact information for contact names in the contact list may include a naming designation for the contact, one or more telephone numbers associated with the contact name, identification of one or more personal devices associated with the contact name, and/or other identifying information. Using the example from above, Alvin intends to send a message to Bob's user profile. Multiple user profiles, including Alvin's user profile, are associated with the communal device, but in this example, Bob is a contact name in only Alvin's contact list. As such, since Bob's user profile is identified as the recipient profile and Bob is a contact name in only Alvin's contact list, Alvin's user profile may be identified as the sender profile, such as in block 216. In other examples, Bob may be a contact name in contact lists associated with multiple user profiles. However, if Bob is identified as "Bob" in one contact list and as "Bobby" in another contact list, the user profile associated with the contact list identifying the contact name as "Bob" may be selected as the sender profile. If the recipient profile is associated with a contact name in contact lists for multiple user profiles, the process 200 may progress to block 217.

At block 217, the process 200 may include utilizing additional heuristic data to identify the user profile to set as the sender profile. If a user profile is selected above a threshold confidence, that user profile may be selected as the sender profile. The heuristic data may include data indicating that previous communications were sent from a user profile within a threshold amount of time of receiving the audio data. In this example, since the user profile was recently set as the sender profile, it is likely that the same user is requesting to send another message from the communal device. The threshold amount of time may be a matter of seconds, minutes, and/or hours. The threshold amount of time may be static, such as, for example, 30 seconds, or the threshold amount of time may be dynamic and may be based at least in part on historical use data of the communal device, such as previous time gaps between messages sent from the same user profile. Additionally, or alternatively, the heuristic data may include an indication that the message is in reply to a previous message sent to the user and/or output by the communal device.

The heuristic data may additionally, or alternatively, include historical usage data of a given communal device by a user in instances where the given communal device is associated with a set of communal devices. For example, multiple communal devices may be associated with each other based at least in part on, for example, their location within an environment, such as a home. One communal device may be located in an area of the environment used frequently by multiple users, such as a living room, while other communal devices may be located in areas of the environment used primarily by a given user, such as a bedroom. In examples, a communal device may be utilized by a given user more frequently than other users to send communications. Data indicating this utilization of the communal device may be used to select the user profile associated with that user as the sender profile. In other examples, the various communal devices of the set of communal devices may be predefined as being associated with a specific user profile, and that user profile may be set to the sender profile. Additionally, or alternatively, the sender profile may be identified based at least in part on identification of a predefined trigger expression accompanying the request to send a communication. For example, one or more trigger expressions may be assigned to one or more user profiles associated with the communal device. Detection of a trigger expression associated with a user profile may result in the user profile being identified as the sender profile. Additionally, or alternatively, the sender profile may be identified based at least in part on a schedule and/or calendar associated with the user profiles associated with the communal device. For example, if a user associated with a given user profile is scheduled to be away from the location where the communal device is situated at the time that the request to send a communication is received, that user profile may be excluded from consideration as the sender profile.

The heuristic data may also include an indication that a signal has been received from a personal device associated with the user profile, at the communal device, that indicates the personal device is within a threshold proximity, such as within a home, to the communal device. This indication may also be based on pairing between the personal device and the communal device using, for example, Bluetooth technology.

The heuristic data described herein may be utilized independently or in combination. When performed in combination, the result of utilizing the various heuristic data may be used to raise an overall confidence level of identifying the sender and/or recipient profile correctly. In examples, the heuristic data may be utilized in a stepwise fashion until the sender and/or recipient profiles are identified, then the process 200 may continue to block 219 where the selected user profile may be set to the sender profile. If the additional heuristic data does not identify the sender profile, then the process 200 may continue to block 218.

At block 218, the process 200 may include querying the user for an indication of which user profile to identify as the sender profile. For example, the communal device may output audio from one or more speakers of the communal device. The audio may include prerecorded and/or synthesized speech that requests additional input from the user to determine the sender profile. One or more microphones of the communal device may then capture an audible response from the user and convert that response to audio data. Automatic speech recognition and natural language understanding techniques as described more fully with respect to FIG. 9 may be utilized to identify a name and/or name indication from the user's speech. The identified name may be selected at block 220.

At block 222, a confidence score may be applied to the name and/or name indicator provided by the user. The confidence score may represent the likelihood that a recognized name and/or name indicator corresponds to a name provided by the user in his/her response. The confidence score may be based on a number of factors including, for example, the similarity of the sound in the user's response to models for language sounds, and the likelihood that a particular name and/or name indicator would be included in the user's response (e.g., using a language or grammar model). The confidence score for the name and/or name indicator may be categorized as low confidence, mid confidence, or high confidence. The categorization of confidence scores may be done using a scale, such as 1 to 9, with confidence scores of 1 to 3 being categorized as low confidence, scores of 4 to 6 being categorized as mid confidence, and scores of 7 to 9 being categorized as high confidence. If the name and/or name indicator is associated with a low confidence score, the process may proceed to block 224, where a determination of whether the maximum number of tries to identify the sender profile has been met. In some examples, the maximum number of tries may be one and the process of sender disambiguation may conclude after one attempt to identify the sender profile. In other examples, the maximum number of tries may be infinite with the process of sender disambiguation concluding when the sender profile is identified and/or the user terminates the process. If the maximum number of tries has been met, the process may conclude at block 226 and the sender profile may default to being identified as a communal profile, which may be referred to as the Home profile. The communal device may output audio confirming that the sender profile is being set as the communal profile. In other examples, at block 226, the process may conclude with the request to send a communication being canceled and/or not fulfilled. The communal device may output audio notifying the user that the request has been canceled and/or not fulfilled and/or that the sender profile could not be identified. In other examples, at block 226, the communal device may output audio notifying the user the sender profile has not been identified and providing the user with one or more user profile options to set as the sender profile. The one or more user profile options may include the user profiles that are associated with and/or registered with the communal device. It should be appreciated that while the confidence scores described herein are based on a 1 to 9 scale, such a scale is for purposes of illustration only. Alternative scales may be utilized and the metrics for the confidence scores may also differ, such as by using percentages.

Returning to block 224, if the maximum number of tries has not been met, the communal device may output, via the one or more speakers, audio querying the user to provide a name and/or name indicator for the sender profile, which may be similar to the functions described with respect to block 218 above. The one or more microphones of the communal device may capture the user's response and convert the audio to audio data. The process 200 may then progress back to block 220.

If the name and/or name indicator is associated with a mid-confidence or a high confidence score, the process may continue to block 228, where a determination may be made as to whether the name and/or name indicator provided by the user matches one or more user profiles for setting as the sender profile. This process may be described as entity recognition, where the name determined from the user speech may be compared with names associated with user profiles from which the message data may be sent to determine whether the name provided by the user matches or substantially matches one or more names associated with the user profiles. This determination may be made by, for example, comparing information that indicates one or more user profiles that are associated with a communal device with the name and/or name indicator provided by the user. The information may include one or more naming designations for the user profile(s). For example, Alvin may have a user profile associated with the communal device. The user profile may include a naming designation such as "Alvin's user profile." The name provided by the user may be identified as "Alvin," and that name may be compared to the naming designation "Alvin's user profile" to determine that a match exists. When performing the user profile matching determination, one or more user profiles may be determined as a match for the name and/or naming designator. The matches may be categorized as low relevance matches, mid relevance matches, or high relevance matches. Relevancy, as described herein, may correspond to the likelihood that the name and/or name indicator provided by the user matches a selected user profile associated with the communal device. In examples, relevancy may be scored on a scale, such as from 1 to 9, with relevancy scores of 1 to 3 corresponding to low relevancy, relevancy scores of 4 to 6 corresponding to mid relevancy scores, and 7 to 9 corresponding to high relevancy scores. If only low relevancy matches are identified, the process may continue to block 230. As described above with respect to confidence scores, the relevancy score scale used herein is provided as illustration only. Other, differing relevancy score scales may be used and different metrics, such as percentages, may also or alternatively be used.

If only low relevancy matches are identified, at block 230, the process 200 may include determining whether the maximum number of tries to identify the sender profile has been met. If the maximum number of tries has been met, the process 200 may conclude at block 226 and the sender profile may default to being identified as a communal profile, which may be referred as the Home profile. The communal device may output audio confirming that the sender profile is being set as the communal profile. In other examples, at block 226, the process may conclude with the request to send a communication being canceled and/or not fulfilled. The communal device may output audio notifying the user that the request has been canceled and/or not fulfilled and/or that the sender profile could not be identified. In other examples, at block 226, the communal device may output audio notifying the user the sender profile has not been identified and providing the user with one or more user profile options to set as the sender profile. The one or more user profile options may include the user profiles that are associated with and/or registered with the communal device. If the maximum number of tries has not been met, the process 200 may continue to block 232, where the communal device may output, via the speakers, audio that may include an indication to the user of the user profiles that are associated with the communal device and asking the user to select one of the stated user profiles. The user may provide an audible response, which may be converted to audio data. The process 200 may then progress back to block 220.

Returning to block 228, if one or more mid or high relevance matches are determined, the process 200 may continue to block 234, where a determination may be made as to how many relevant user profiles are identified. If only one user profile was identified and that user profile was identified as a high relevancy match, the selected user profile may be selected as the sender profile and the process 200 may conclude. If only one user profile was identified and that user profile was identified as a mid-relevancy match, the process may continue to block 236. At block 236, the process 200 may include outputting audio, via the one or more speakers of the communal device, that queries the user to confirm that the mid relevancy matching user profile should be set as the sender profile. For example, the communal device may output prerecorded or synthesized speech stating "from Alvin?" or "from Alvin's profile," for example. If the user responds affirmatively, such as with a "yes," the selected user profile may be set as the sender profile and the process 200 may conclude. If the user responds in the negative, such as by saying "no," the selected user profile may be added to a skip list at block 238. As used herein, a skip list may correspond to data stored by the communal device and/or a remote system that indicates one or more user profiles that have been confirmed as not corresponding to the sender profile. The skip list may, for example, include the user profile associated with the recipient profile and other user profiles that are determined to not be the sender profile from the heuristic data described herein. The process 200 may then continue to block 224 and may progress as described above with respect to block 224. In some examples, the process 200 may not include adding the selected user profile to a skip list and may proceed to block 224. If the user responds in the negative, such as by saying "no," and the user provides a correction, such as "no, Allen" or "no, from Allen," the process 200 may proceed to block 240 where the selected profile may be added to the skip list, as described with respect to block 238, and the corrected name may be introduced back at block 220 for processing.

Returning to block 234, if multiple mid to high relevancy user profile matches are identified, the process 200 may continue to block 242 where it may be determined whether the maximum number of tries to identify the user profile to select as the sender profile has been met. If the maximum number of tries has been met, the process 200 may conclude at block 226 and the sender profile may be set to the communal profile. In other examples, at block 226, the process may conclude with the request to send a communication being canceled and/or not fulfilled. The communal device may output audio notifying the user that the request has been canceled and/or not fulfilled and/or that the sender profile could not be identified. In other examples, at block 226, the communal device may output audio notifying the user the sender profile has not been identified and providing the user with one or more user profile options to set as the sender profile. The one or more user profile options may include the user profiles that are associated with and/or registered with the communal device. If the maximum number of tries to identify the user profile to select as the sender profile has not been met, the process may continue to block 244.

At block 244, the process 200 may include determining the number of mid to high relevance user profile matches. If a small number of mid to high level matches is identified, such as, for example, two or three matches, the process 200 may continue to block 246. If a larger number of mid to high level matches is identified, such as, for example, four or more matches, the process 200 may continue to block 248. At block 246, the communal device may output audio querying the user to select from the two or three user profiles that were identified. For example, the query may include prerecorded or synthesized speech that states "from Alvin or Allen?" or "from Alvin, Allen, or Aaron?" One or more microphones of the communal device may then capture a response from the user and the process may continue back to block 220. In some examples, the query may also include an ordinal value associated with the two or three user profiles that were identified, such as "from (1) Alvin, (2) Allen, or (3) Aaron?" The user may respond, as described above, by stating the name associated with a selected user profile and/or the response may include an ordinal selection. At block 248, the communal device may output audio querying the user to repeat the name and/or name indicator. For example, the communal device may output prerecorded or synthesized speech stating "from whom?" One or more microphones of the communal device may then capture a response from the user and the process 200 may continue back to block 220. The process 200 may continue as described above until the sender profile is filled with either the communal profile or a profile associated with the communal device.

Figure 3:
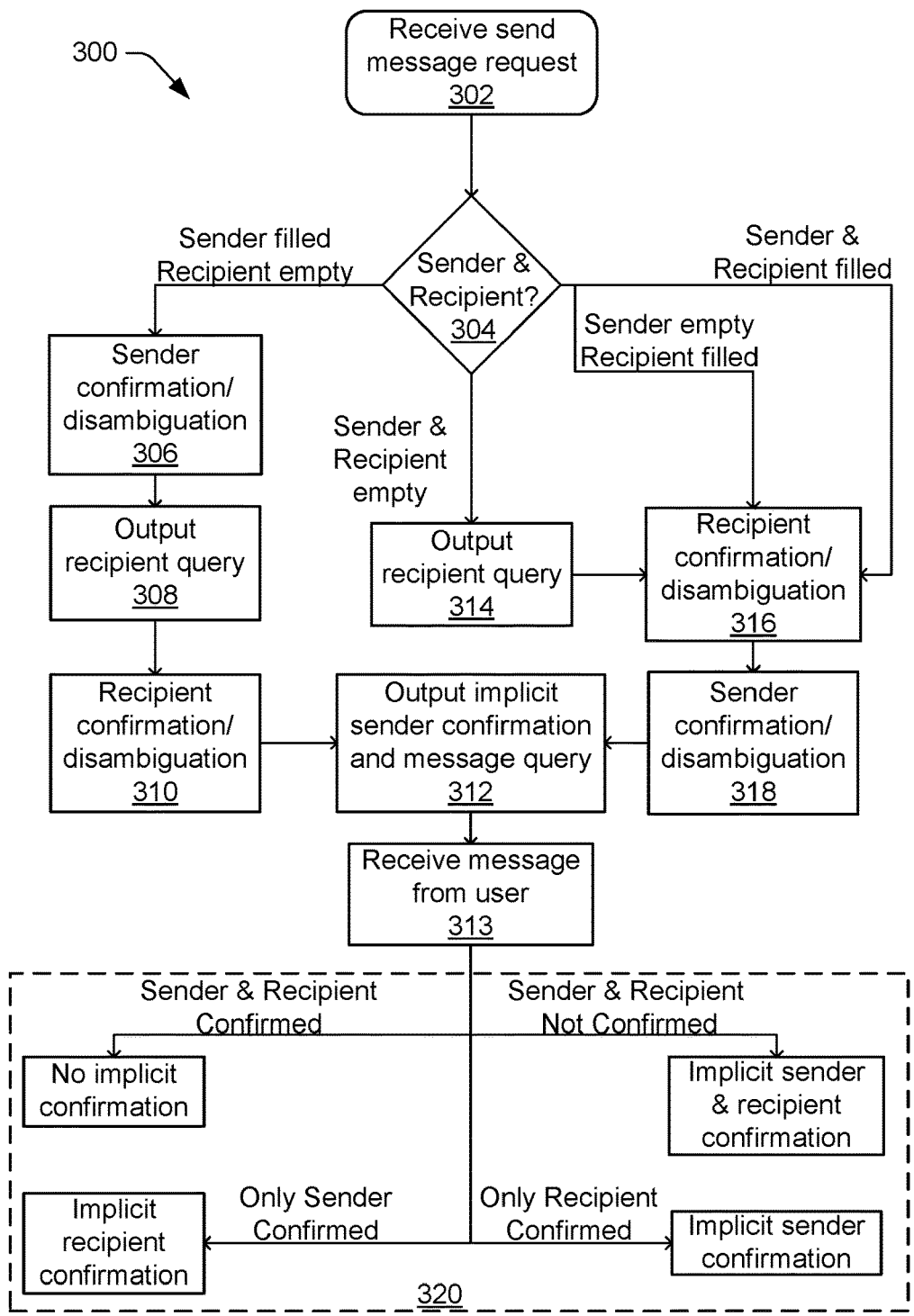
FIG. 3 illustrates a flow diagram of another example process for disambiguating and/or confirming sender and recipient profiles.

FIG. 3 illustrates a flow diagram of another example process 300 for disambiguating and/or confirming sender and recipient profiles. The order in which the operations or steps are described is not intended to be construed as a limitation, and any number of the described operations may be combined in any order and/or in parallel to implement method 300.

At block 302, the process 300 may include receiving a request from a user to send a communication, such as message data. The request may be sent from a user of a communal device, such as, for example, a voice-assistant device. The request may correspond to audio from the user that is captured by one or more microphones of the communal device. The microphones may generate audio data corresponding to the audio, and that audio data may be analyzed using automatic speech recognition and natural language understanding techniques to determine a send-communication request by the user.

At block 304, the process 300 may include determining whether a sender profile and a recipient profile were identified in the request from the user. Determining whether the sender and/or recipient profile were identified may be performing utilizing the natural language understanding techniques described in more detail with respect to FIG. 9. Four possible results may occur from the determination made at block 304: (1) the sender profile is identified but the recipient profile is not identified; (2) the sender and recipient profiles were not identified; (3) the sender profile is not identified but the recipient profile is identified; or (4) the sender and recipient profiles are identified.

If the sender profile is identified but the recipient profile is not identified, the process 300 may continue to block 306. At block 306, the process 300 may include performing sender profile confirmation and/or disambiguation to set the sender profile as a user profile associated with the communal device. These confirmation and/or disambiguation operations may be similar to those described with respect to FIG.

2, above. The process 300 may then continue to block 308, where one or more speakers of the communal device may output audio querying the user for an indication of the recipient profile. The query may include prerecorded or synthesized speech stating, for example, "to whom?" One or more microphones of the communal device may capture the user's response and may generate corresponding audio data. The process 300 may then proceed to block 310, where recipient profile confirmation and/or disambiguation may be performed.

Recipient confirmation and/or disambiguation may be performed utilizing the heuristic data described with respect to FIG. 2. For example, if a contact list associated with the sender profile contains only one contact name, the user profile associated with that contact name may be set as the recipient profile. In other examples, the communal device and/or a remote system may perform automatic speech recognition and natural language understanding techniques as described more fully with respect to FIG. 9 to identify a name and/or name indication from the user's speech that corresponds to the requested recipient.

A confidence score may be applied to the name and/or name indicators provided by the user. The confidence score may represent the likelihood that a recognized name and/or name indicator corresponds to a name provided by the user in his/her response. The confidence score may be based on a number of factors including, for example, the similarity of the sound in the user's response to models for language sounds, and the likelihood that a particular name and/or name indicator would be included in the user's response (e.g., using a language or grammar model). The confidence score for the name and/or name indicator may be categorized as low confidence, mid confidence, or high confidence. The categorization of confidence scores may be done using a scale, such as 1 to 9, with confidence scores of 1 to 3 being categorized as low confidence, scores of 4 to 6 being categorized as mid confidence, and scores of 7 to 9 being categorized as high confidence. If the name and/or name indicator is associated with a low confidence score, a determination may be made as to whether the maximum number of tries to identify the recipient profile has been met. If the maximum number of tries has been met, the recipient profile may default to being identified as a communal profile, which may be referred as the Home profile. The communal device may output audio confirming that the recipient profile is being set as the communal profile. In other examples, the communal device may output audio stating that the recipient profile could not be recognized and/or that the request to send a communication will not be fulfilled.

If the maximum number of tries has not been met, the communal device may output, via the one or more speakers, audio querying the user to provide a name and/or name indicator for the recipient profile. The one or more microphones of the communal device may capture the user's response and convert the audio to audio data. The process may then start again with determining a confidence of the name and/or name indicator from the user's response.

If the name and/or name indicator is associated with a mid-confidence or a high confidence score, a determination may be made as to whether the name and/or name indicator provided by the user matches one or more user profiles for setting as the recipient profile. This determination may be made by, for example, comparing contact information from one or more contact lists associated with the sender profile and/or other profiles associated with the communal device. When performing the user profile matching determination, one or more user profiles may be determined as a match for the name and/or naming indication provided by the user. The matches may be categorized as low relevance matches, mid relevance matches, or high relevance matches. Relevancy, as described herein, may correspond to the likelihood that the name and/or name indicator provided by the user matches a selected user profile to set as the recipient profile. In examples, relevancy may be scored on a scale, such as from 1 to 9, with relevancy scores of 1 to 3 corresponding to low relevancy, relevancy scores of 4 to 6 corresponding to mid relevancy scores, and 7 to 9 corresponding to high relevancy scores.

If only low relevancy matches are identified, a determination may be made as to whether the maximum number of tries to identify the recipient profile has been met. If the maximum number of tries has been met, the recipient profile may default to being identified as a communal profile, which may be referred as the Home profile, or the recipient profile may not be filled. The communal device may output audio confirming that the recipient profile is being set as the communal profile, or the communal device may output audio stating that the recipient profile could not be determined and the request to send a communication will not be completed. If the maximum number of tries has not been met, the communal device may output, via the speakers, audio that may include an indication to the user of the possible user profiles to set as the recipient profile and asking the user to select one of the stated user profiles. The user may provide an audible response, which may be converted to audio data. The process may then progress back to determining a confidence score associated with the user's response.

If one or more mid or high relevance matches are identified, a determination may be made as to how many relevant user profiles are identified. If only one user profile was identified and that user profile was identified as a high relevancy match, the selected user profile may be set as the recipient profile and the process of disambiguating the recipient profile may conclude. If only one user profile was identified and that user profile was identified as a mid-relevancy match, the communal device may output audio, via the one or more speakers, that queries the user to confirm that the mid relevancy matching user profile should be set as the recipient profile. For example, the communal device may output prerecorded or synthesized speech stating "to Bob?" or "to Bob's profile," for example. If the user responds affirmatively, such as with a "yes," the selected user profile may be set as the recipient profile and the process of disambiguating the recipient profile may conclude. If the user responds in the negative, such as by saying "no," the selected user profile may be added to a skip list, as described above with respect to FIG. 2. The skip list may, for example, include the user profile associated with the sender profile and other user profiles that are determined to not be the recipient profile from the heuristic data described herein. If, instead of the user responding by saying "no," the user provides a correction, such as "no, Beth" or "no, to Beth," the previously-selected profile may be added to the skip list, as described above, and the disambiguation process may restart by determining a confidence score associated with the corrected name and continuing as described above.

Returning to the determination of the number of relevant matches, if multiple mid to high relevancy user profile matches are identified, a determination may be made as to whether the maximum number of tries to identify the user profile to select as the recipient profile has been met. If the maximum number of tries has been met, the recipient profile may be set to the communal profile or the recipient profile may not be set and the request to send a communication may be canceled. If the maximum number of tries to identify the user profile to select as the recipient profile has not been met, a determination of the number of mid to high relevance user profile matches may be made. If a small number of mid to high level matches is identified, such as, for example, two or three matches, the communal device may output audio querying the user to select from the two or three user profiles that were identified. For example, the query may include prerecorded or synthesized speech that states "to Bob or Beth?" or "to Bob, Beth, or Bart?" One or more microphones of the communal device may then capture a response from the user and the process may restart by utilizing the response and determination a confidence score associated therewith. If a larger number of mid to high level matches is identified, such as, for example, four or more matches, the communal device may output audio querying the user to repeat the name and/or name indicator. For example, the communal device may output prerecorded or synthesized speech stating "to whom?" One or more microphones of the communal device may then capture a response from the user and the process may restart by utilizing the response and determining a confidence score associated with the response. The process may continue as described above until the recipient profile is filled with the communal profile or a profile associated with a contact list available to the communal device, or the process may conclude by not sending a communication as requested when the recipient profile cannot be filled.

At block 312, the process 300 may include outputting implicit sender confirmation and/or querying the user to provide a message. For example, one or more speakers of the communal device may output audio stating "what's the message?" In other examples, an implicit confirmation of the selected sender profile may also be provided, such as "Alvin, what's the message?" It should be noted that while the implicit confirmations described with respect to this example and other examples include a first name associated with a user profile, additional details such as a last name or surname may additionally or alternatively be provided. In this example, the user may provide a correction if the sender profile should not be set to the selected profile, here a profile associated with "Alvin." The user may otherwise provide audio that represents the message to be sent, at block 313. The audio may be captured by the one or more microphones of the communal device and corresponding audio data may be generated. In some examples, automatic speech recognition techniques, as described more fully with respect to FIG. 9, may be utilized to generate text data representing a transcription of the audio data.

Returning to block 304, the second of four possible results, namely the sender and recipient profiles not being identified, may occur. In this example, the process 300 may proceed to block 314 where one or more speakers of the communal device may output audio querying the user to provide an indication of the recipient profile. For example, the query may include the phrase "to whom?" One or more microphones of the communal device may capture the audio provided in response by the user and may convert the audio to audio data. The audio data may be utilized at block 316 to perform recipient profile disambiguation and confirmation as described with respect to block 310.

If the recipient profile is identified at block 316, the process 300 may proceed to block 318, where sender profile disambiguation and confirmation may be performed, which may be similar to the operations described with respect to FIG. 2. The process 300 may then proceed to block 312, as described above, where the communal device may query the user to provide the message to be sent to the recipient profile.

Returning again to block 304, the third or fourth of four possible results, namely the sender profile being unidentified and the recipient profile being identified, or the sender and recipient profiles being identified, may occur. In these examples, the process 300 may proceed to block 316 where recipient disambiguation and/or confirmation may be performed as described with respect to block 310. If the recipient profile is identified at block 316, the process 300 may proceed to block 318, where sender profile disambiguation and confirmation may be performed, which may be similar to the operations described with respect to FIG. 2. The process 300 may then proceed to block 312, as described above, where the communal device may query the user to provide the message to be sent to the recipient profile.

Once the message is provided by the user, the process 300 may continue to block 320 where the communal device may provide one or more result statements to the user. The one or more result statements may depend on whether the sender and/or the recipient profile was confirmed during the sender and recipient profile disambiguation and confirmation operations described above. For example, if the sender and recipient profiles are confirmed, no implicit confirmation may be provided and the result statement of "sending," for example, may be output by one or more speakers of the communal device. In this example, since the sender and recipient profiles have been determined, such as at a high confidence level, the result statement does not include unnecessary confirmatory wording. If, instead, the sender and recipient profiles are not confirmed at a high level of confidence, implicit sender and recipient profile confirmation may be provided and the result statement of "sending to Bob from Alvin," for example, may be output by the one or more speakers of the communal device. This result statement provides details on both the selected sender profile and the selected recipient profile, which may provide the user with the ability to respond with a correction if the sender and/or the recipient profile were not selected accurately. If only the sender profile was confirmed at a high level of confidence, implicit recipient profile confirmation may be provided and the result statement of "sending to Bob," for example, may be output to provide the user with an indication of the chosen recipient profile and the opportunity to correct the same. If only the recipient profile was confirmed at a high level of confidence, implicit sender profile confirmation may be provided and the result statement of "sending from Alvin," for example, may be output to provide the user with an indication of the chosen sender profile and the opportunity to correct the same.

Figure 4:
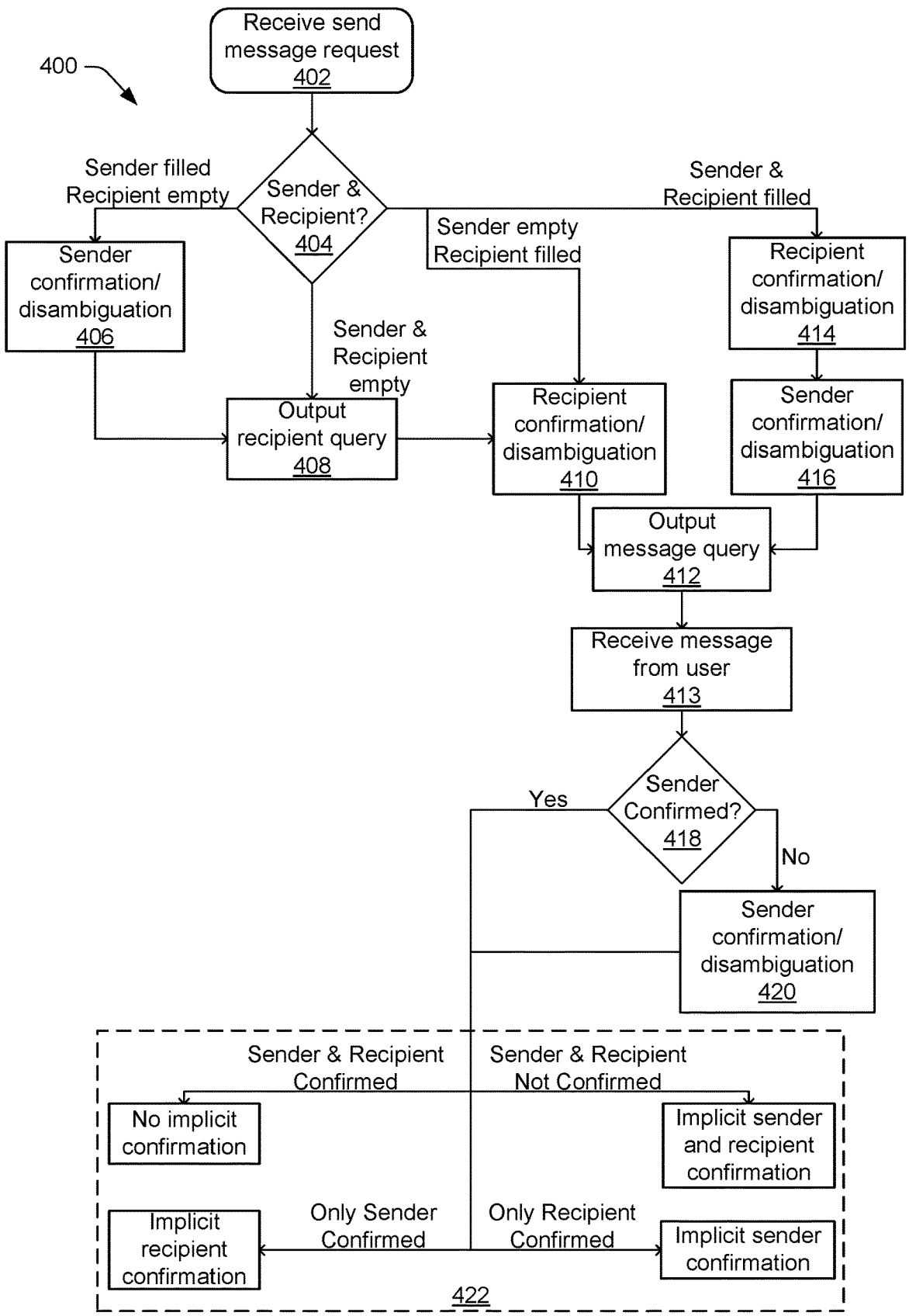
FIG. 4 illustrates a flow diagram of another example process for disambiguating and/or confirming sender and recipient profiles.

FIG. 4 illustrates a flow diagram of another example process 400 for disambiguating and/or confirming sender and recipient profiles. The order in which the operations or steps are described is not intended to be construed as a limitation, and any number of the described operations may be combined in any order and/or in parallel to implement method 400.

At block 402, the process 400 may include receiving a request to send a communication, such as a message. The request may be sent from a user of a communal device, such as, for example, a voice-assistant device. The request may correspond to audio from the user that is captured by one or more microphones of the communal device. The microphones may generate audio data corresponding to the audio, and that audio data may be analyzed using automatic speech recognition and natural language understanding techniques to determine a send-communication request by the user.

At block 404, the process 400 may include determining whether a sender profile and a recipient profile were identified in the request from the user. Determining whether the sender and/or recipient profile were identified may be performed utilizing the natural language understanding techniques described in more detail with respect to FIG. 9. Four possible results may occur from the determination made at block 404: (1) the sender profile is identified but the recipient profile is not identified; (2) the sender and recipient profiles are not identified; (3) the sender profile is not identified but the recipient profile is identified; or (4) the sender and recipient profile are identified.

If the sender profile is identified but the recipient profile is not identified, the process 400 may continue to block 406. At block 406, the process 400 may include performing sender profile confirmation and/or disambiguation to identify the sender profile as a user profile associated with the communal device. These confirmation and/or disambiguation operations may be similar to those described with respect to FIG. 2. The process 400 may then continue to block 408, where one or more speakers of the communal device may output audio querying the user for an indication of the recipient profile. The query may include prerecorded or synthesized speech stating, for example, "to whom?" One or more microphones of the communal device may capture the user's response and may generate corresponding audio data. The process 400 may then proceed to block 410, where recipient profile confirmation and/or disambiguation may be performed. Recipient profile confirmation and/or disambiguation may be similar to that described with respect to FIG. 3 at block 310.

At block 412, the process may include querying the user to provide a message. For example, one or more speakers of the communal device may output audio stating "what's the message?" The user may then provide audio that represents the message to be sent at block 413. The audio may be captured by the one or more microphones of the communal device and corresponding audio data may be generated. In some examples, automatic speech recognition techniques, as described more fully with respect to FIG. 9, may be utilized to generate text data representing a transcription of the audio data.

Returning to block 404, the second of four possible results, namely the sender and recipient profiles not being identified, may occur. In this example, the process 400 may proceed to block 408 where one or more speakers of the communal device may output audio querying the user to provide an indication of the recipient profile. For example, the query may include the phrase "to whom?" One or more microphones of the communal device may capture the audio provided in response by the user and may convert the audio to audio data. The audio data may be utilized at block 410 to perform recipient profile disambiguation and confirmation as described above. If the recipient profile is identified at block 410, the process 400 may proceed to block 412 where the communal device may query the user to provide the message to be sent to the recipient profile.

Returning again to block 404, the third of four possible results, namely the sender profile being unidentified and the recipient profile being identified, may occur. In these examples, the process 400 may proceed to block 410 where recipient disambiguation and/or confirmation may be performed as described above. If the recipient profile is identified at block 410, the process 400 may proceed to block 412, as described above, where the communal device may query the user to provide the message to be sent to the recipient profile.

Returning again to block 404, the fourth of four possible results, namely the sender profile and the recipient profile being identified, may occur. In these examples, the process 400 may proceed to block 414 where recipient disambiguation and/or confirmation may be performed as described with respect to block 410, above. If the recipient profile is identified at block 414, the process 400 may proceed to block 416, where sender profile disambiguation and confirmation may be performed, which may be similar to the operations described with respect to FIG. 2. The process 400 may then proceed to block 412, as described above, where the communal device may query the user to provide the message to be sent to the recipient profile.

Once the message is provided by the user, the process 400 may continue to block 418 where a determination may be made as to whether the sender profile has been confirmed. Determining whether the sender profile has been confirmed may be based at least in part on the sender profile disambiguation and confirmation operations described above. The sender profile may also be confirmed based at least in part on additional data related to the message and/or information about the request to send the communication. For example, where text data representing a transcription of the audio message data is generated, natural language understanding techniques as described more fully below with respect to FIG. 9 may be utilized to determine if the content of the message data includes information that increases a confidence level that the selected user profile corresponds to the sender profile. Analysis of the content of the message data may also be performed to determine the recipient profile or increase a confidence level that the selected user profile corresponds to the recipient profile. Information from the content of the message data may include words or phrases indicating a relationship between the sender and recipient. For example, a word representing a familial relationship may be present in the message data, such as "mom," "dad," "brother," "sister," etc. Information about the familial relationship may be utilized to determine the sender profile and/or recipient profile. It should be noted that while examples described herein utilize the content of a message to confirm the recipient profile, combinations of the sender profile, the recipient profile, and the message content may be used to determine each other. For example, a combination of the sender profile and the message content may be used to determine the recipient profile. A combination of the recipient profile and the message content may be used to determine the sender profile. A combination of the sender profile and the recipient profile may be used to determine at least a portion of the message content.

Additional information may also, or alternatively, be used to help confirm the sender profile and/or the recipient profile. The additional information may include data indicating that a most recent message sent from the communal device was from a certain user profile. The sender profile may be set as the user profile corresponding to the sender of the most recent message based at least in part on the current message request being received within a threshold amount of time from the most recent message sent from the communal device. The additional information may also include data indicating that, while multiple user profiles have a contact name associated with a recipient profile, only one of those user profiles has been identified as a sender profile for sending past message data to the recipient profile. The additional information may also include data indicating the time of day and/or the day of the week of the request to send a communication. Different users of the communal device may be associated with historical use trends for sending communications via the communal device, and that information may be utilized to disambiguate the sender profile. The additional information may also include identification of a predefined trigger expression accompanying the request to send a communication. For example, one or more trigger expressions may be assigned to one or more user profiles associated with the communal device. Detection of a trigger expression associated with a user profile may result in the user profile being identified as the sender profile.

At block 422, the process 400 may include providing one or more result statements to the user. The one or more result statements may depend on whether the sender and/or the recipient profile was confirmed during the sender and recipient profile disambiguation and confirmation operations described above. For example, if the sender and recipient profiles are confirmed, no implicit confirmation may be provided and the result statement of "sending," for example, may be output by one or more speakers of the communal device. In this example, since the sender and recipient profiles have been determined, such as at a high confidence level, the result statement does not include unnecessary confirmatory wording. If, instead, the sender and recipient profiles are not confirmed at a high level of confidence, implicit sender and recipient profile confirmation may be provided and the result statement of "sending to Bob from Alvin," for example, may be output by the one or more speakers of the communal device. This result statement provides details on both the selected sender profile and the selected recipient profile, which may provide the user with the ability to respond with a correction if the sender and/or the recipient profile were not selected accurately. If only the sender profile was confirmed at a high level of confidence, implicit recipient profile confirmation may be provided and the result statement of "sending to Bob," for example, may be output to provide the user with an indication of the chosen recipient profile and the opportunity to correct the same. If only the recipient profile was confirmed at a high level of confidence, implicit sender profile confirmation may be provided and the result statement of "sending from Alvin," for example, may be output to provide the user with an indication of the chosen sender profile and the opportunity to correct the same.

Figure 5:
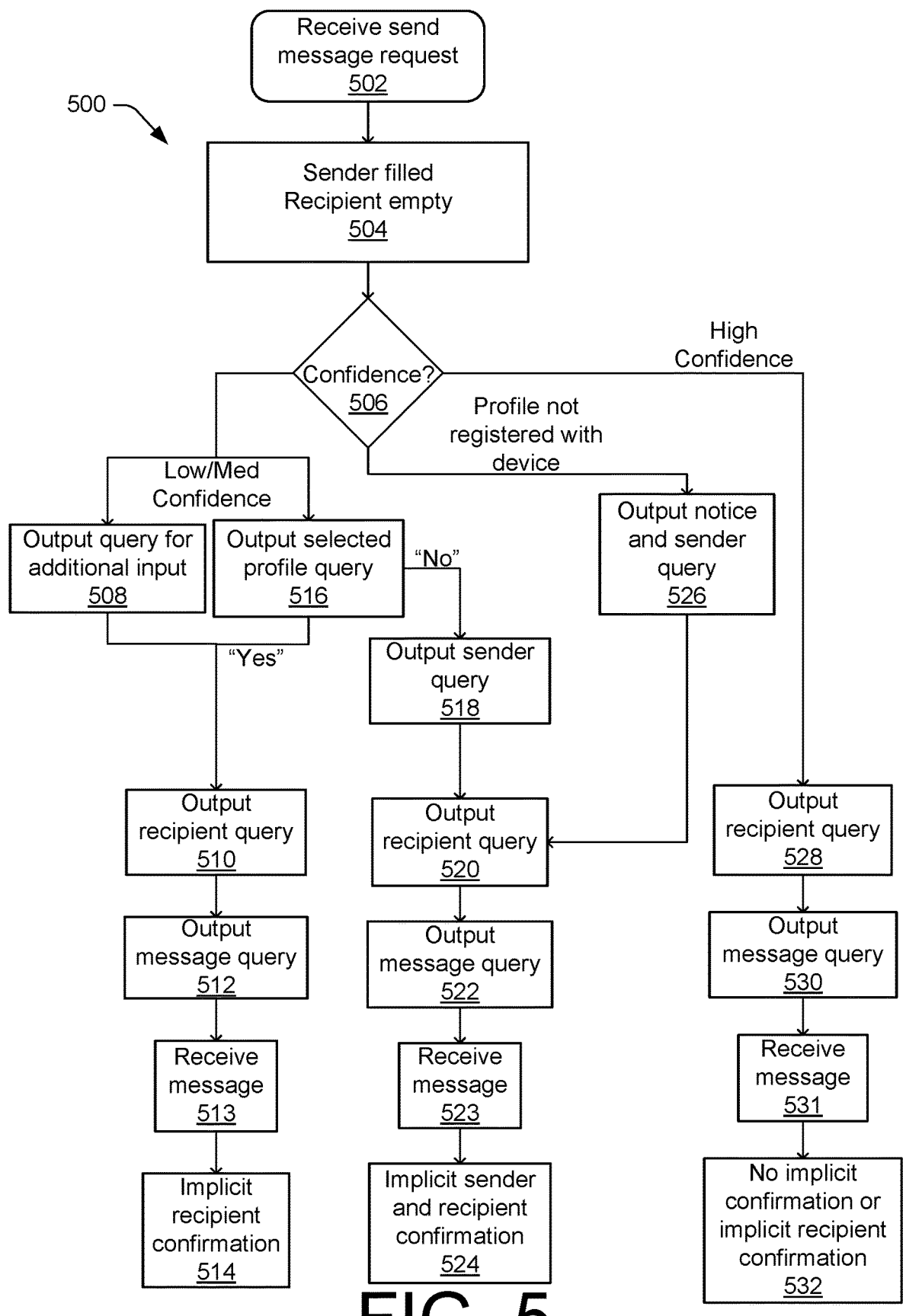
FIG. 5 illustrates a flow diagram of an example process for communicating with a sender of message data to confirm sender and recipient profiles.

FIG. 5 illustrates a flow diagram of an example process 500 for communicating with a sender of a message to confirm sender and recipient profiles. The order in which the operations or steps are described is not intended to be construed as a limitation, and any number of the described operations may be combined in any order and/or in parallel to implement method 500.

At block 502, the method 500 may include receiving a request from a user to send a communication, such as a message. The request may be sent from a user of a communal device, such as, for example, a voice-assistant device. The request may correspond to audio from the user that is captured by one or more microphones of the communal device. The microphones may generate audio data corresponding to the audio, and that audio data may be analyzed using automatic speech recognition and natural language understanding techniques to determine a send-communication request by the user.

At block 504, the method 500 may include determining that the sender profile is identified but the recipient profile is not identified. To illustrate, the user in this example may be Alvin. The request from Alvin was "send message from Alvin." In addition to determining an intent to send a communication, the communal device and/or a remote system may also determine that the communication is to be sent from a user profile associated with Alvin. However, the request did not include an indication of the recipient profile and thus the recipient profile has not been identified.

At block 506, the process 500 may include determining a confidence score associated with the selected sender profile. The confidence score for the selected user profile may be categorized as low confidence, mid confidence, or high confidence. The categorization of confidence scores may be done using a scale, such as 1 to 9, with confidence scores of 1 to 3 being categorized as low confidence, scores of 4 to 6 being categorized as mid confidence, and scores of 7 to 9 being categorized as high confidence. If the selected user profile is associated with a low confidence score or mid confidence score, a determination may be made as to whether one or more user profiles correspond to the user's indication of the sender profile. For example, more than one user profile corresponding to a person with a first name of "Alvin" may be associated with the communal device. In this example, at block 508, the process 500 may include querying the user to select between the selected multiple user profiles. For example, one or more speakers of the communal device may output audio stating "which Alvin?" The one or more microphones of the communal device may capture audio corresponding to a response from the user and convert that audio to audio data, which may be used to determine the user profile to set as the sender profile. For example, the user may say "Alvin Jones," indicating which Alvin to send the message data from.

At block 510, the process 500 may include querying the user for an indication of the recipient profile. Querying the user may include outputting audio, via one or more speakers of the communal device, asking "to whom?" One or more microphones of the communal device may capture a response from the user, such as "Bob" as shown in FIG. 5, and may set the recipient profile to a user profile associated with "Bob."

At block 512, the process may include querying the user for a message to send to the recipient profile. At block 513, the message may be received and may include audio data generated by the one or more microphones of the communal device and, in examples, text data representing a transcription of the audio data.

At block 514, the process 500 may include outputting a confirmation message to the user based at least in part on the series of interactions described above. In the example shown at block 514, the confirmation message may be "sending to Bob," for example, which provides an indication of the recipient profile but not the sender profile. Providing a confirmation message such as the one illustrated at block 514 may be based at least in part on the user confirming the sender profile at block 508.

Returning to block 506, if the selected user profile is associated with a low confidence score or mid confidence score, a determination may be made as to whether one or more user profiles may correspond to the user's indication of the sender profile. If only one user profile corresponds to the user's indication of the sender profile, the process may continue to block 516, where the communal device may query the user for confirmation of the selected user profile. For example, one or more speakers of the communal device may output audio stating "from Alvin, right?" If the user responds affirmatively, such as by saying "yes," the process may continue to block 510, described above. Here, the confirmation message may provide an indication of the recipient profile but not the sender profile, as described with respect to block 514 above.

If the user responds in the negative, such as by saying "no," the process may continue to block 518 where the communal device may query the user for an indication of the sender profile. For example, one or more speakers of the communal device may output audio stating "from whom?" One or more microphones of the communal device may capture the user's response, here "Allen," and generate corresponding audio data to be utilized to identify the sender profile. The process may then continue to block 520, where the one or more speakers of the communal device may output a recipient profile query, such as "to whom?" The corresponding response may be utilized to identify the recipient profile. At block 522, the communal device may query the user to provide a message, and at block 523 the message provided by the user may be received. At block 524, a confirmation message may be provided. Unlike the confirmation message from block 514, the confirmation message of block 524 may include an indication of the recipient profile and an indication of the sender profile. Providing indications of the recipient and sender profile in this example may be based at least in part on a low confidence that the chosen user profiles for the sender and recipient profiles are correct.

Returning to block 506, if the user profile indicated as the sender profile is not registered or otherwise associated with the communal device, the process may continue to block 526, where the communal device may output audio indicating that the requested profile is not associated with the communal profile and querying the user to provide an alternative indication of the sender profile. One or more microphones of the communal device may capture the user's response and the process may continue to block 520, described above. The confirmation message may be similar to that provided in block 524.

Returning again to block 506, if the selected user profile is associated with a high confidence score, the process may proceed to block 528 where the one or more speakers of the communal device may output a recipient profile query, such as "to whom?" The corresponding response may be utilized to identify the recipient profile. At block 530, the communal device may query the user to provide a message, and at block 531 the message may be received from the user. At block 532, a confirmation message may be provided. Unlike the confirmation message from block 514, the confirmation message of block 532 may not include an indication of the sender or recipient profiles, such as "sending, "for example, or the confirmation message may include an indication of the recipient profile but not the sender profile, such as "sending to Bob," for example. Providing confirmation messages such as these may be based at least in part on a high confidence that the chosen user profiles for the sender and recipient profiles are correct.

Figure 6:
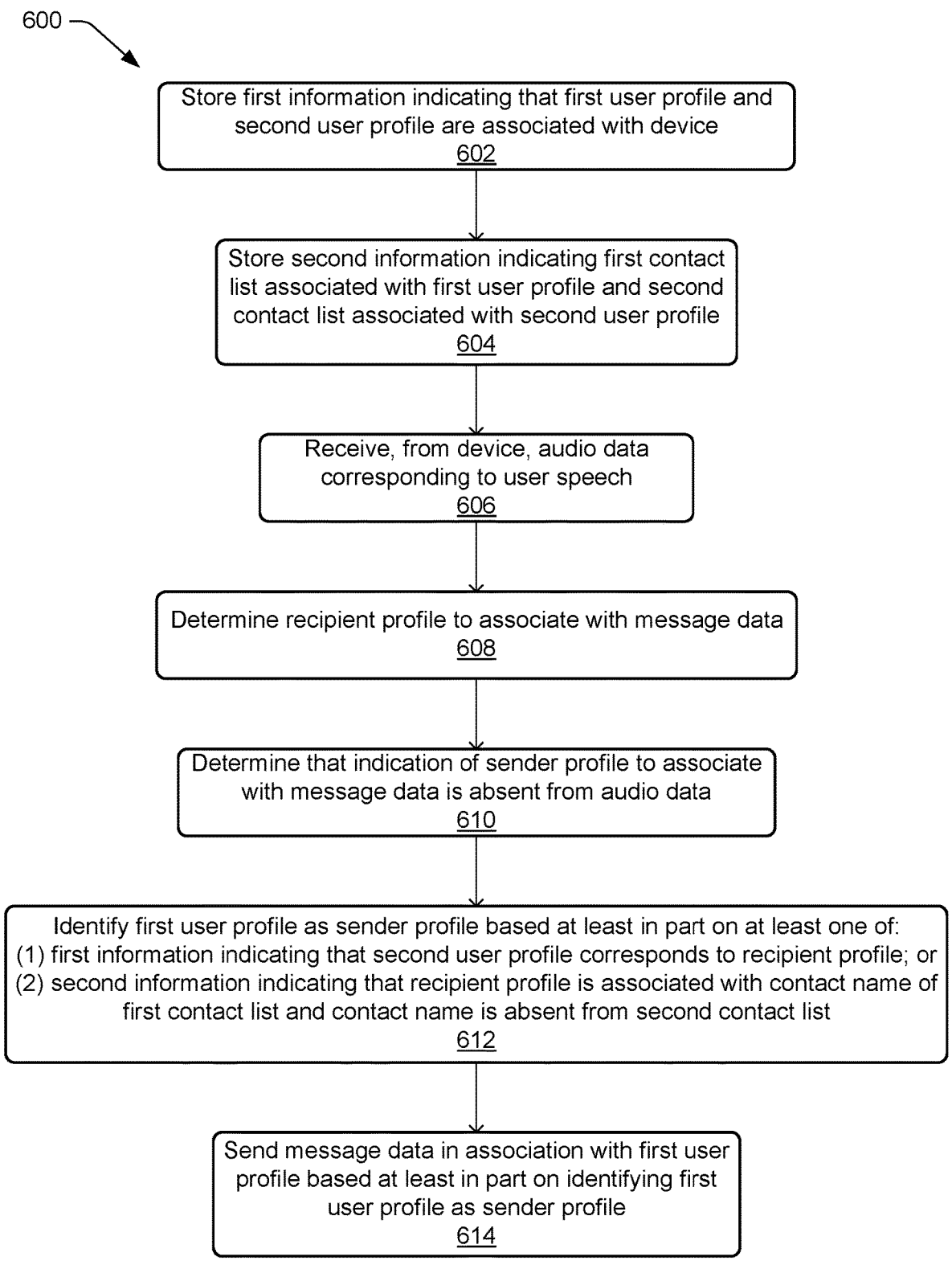
FIG. 6 illustrates a flow diagram of an example process for disambiguating the sender profile of message data.

FIG. 6 illustrates a flow diagram of an example method 600 for disambiguating the sender profile of message data. The order in which the operations or steps are described is not intended to be construed as a limitation, and any number of the described operations may be combined in any order and/or in parallel to implement method 600.

At block 602, the method 600 may include storing first information indicating that a first user profile and a second user profile are associated with a device. The first user profile and the second user profile may be associated with the device and/or may be associated with a user account that is registered with the device. In examples, the user profiles that are associated with the device may correspond to members of a family and/or a group of users that reside in the same environment, such as a home.

At block 604, the method 600 may include storing second information indicating a first contact list associated with the first user profile and a second contact list associated with a second user profile. The device and/or a remote system may also be configured to store and/or access the contact lists that correspond to the user profiles. Each of the user profiles may be associated with their own contact list, which may include contact information, including name designations, for one or more contact names that the user communicates with. By way of example, the contact information for a contact name associated with the contact lists may include a name and/or nickname of a person corresponding to the contact, one or more telephone numbers, and/or one or more devices that the contact name is associated with, including devices, for example. A contact name may be identified on only one contact list associated with one user profile of the device, or the contact name may be identified on multiple contact lists associated with multiple user profiles of the device. When the contact name is identified on multiple contact lists, the contact information associated with that contact name may differ. For example, the name of the contact may be "Nick" in a first user profile's contact list while the name may be "Nicholas" in a second user profile's contact list. These differences may be utilized when performing sender and/or recipient disambiguation as described herein.

At block 606, the method 600 may include receiving, from the device, audio data corresponding to user speech from a user associated with the first user profile. The user may speak, and that audio may be captured by one or more microphones of the device. The one or more microphones may generate audio data corresponding to the audio. The audio data may include the user speech and other components, such as, for example, background noise. The audio data corresponding to user speech may be received over a network. The network may represent an array of wired networks, wireless networks, such as WiFi, or combinations thereof. The audio data may be received at, for example, a remote system. In some instances, the remote system may be local to an environment associated the device. In some instances, some or all of the functionality of the remote system may be performed by the device. The method may include generating, via automatic speech recognition (ASR) performed on the audio data, text data corresponding to the audio data. For example, once the audio data is received from the device, the portion of the audio data corresponding to the user speech may be separated from other components of the audio data, such as, for example, background noise. ASR techniques may be used to determine words making up the user speech. For example, ASR techniques may include generation of a list that includes the most likely words or phrases spoken by the user, such as an "N-best list," and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings. Additional details regarding ASR techniques that may be used are described below with respect to FIG. 9. The method may include determining, via natural language understanding (NLU) performed on the text data, an intent to send message data. For example, words and/or phrases making up the text data may be analyzed to determine intent. Generally, the NLU process takes textual input and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device, such as the device, to complete that action. For example, if a spoken utterance is processed using ASR and outputs the text "send a message to Bob" the NLU process may determine that the user intended the device to capture speech of the user for sending, as an audio file, for output on a device of associated with "Bob." Additional details regarding the NLU process are provided with respect to FIG. 9, below.

At block 608, the method 600 may include determining a recipient profile to associate with the message data. Determining the recipient profile may be perform using NLU techniques, which may be similar to that described with respect to block 606. For example, if a spoken utterance is processed using ASR and outputs the text "send a message to Bob" the NLU process may determine that the user intended a user profile associated with "Bob" to be set as the recipient profile.

At block 610, the method 600 may include determining that an indication of a sender prolife to associate with the message data is absent from the audio data. Determining that the audio data does not include an indication of the sender profile may be performed using NLU techniques. For example, once it is determined that the user intended to send a message, the text data may be analyzed to identify the sender profile and the recipient profile. The recipient profile may be identified by determining a name and/or name indicator following a word that suggests the name and/or name indicator corresponds to the recipient profile. For example, user speech stating "send a message to Bob" includes the phrase "to Bob." The word "to" suggests that the name indicator, here "Bob," corresponds to the recipient profile. It should be understood that while this example describes the word "to" as an indicator of the user profile to set as the recipient profile, other words and/or permutations may be used, such as "directed at" and "directed to," for example. The sender profile may be identified by determining a name and/or name indicator following a word that suggests the name and/or name indicator corresponds to the sender profile. For example, user speech stating "send a message from Alvin" includes the phrase "from Alvin." The word "from" suggests that the name indicator, here "Alvin," corresponds to the sender profile. However, if the user speech does not contain a phrase such as that described herein that indicates the sender profile, then it may be determined that no indication of the sender profile has been provided by the user.

At block 612, the method 600 may include identifying the first user profile as the sender profile based at least in part on heuristic data. The heuristic data may include the first information indicating that the second user profile corresponds to the recipient profile. The heuristic data may additionally, or alternatively, include the second information indicating that the recipient profile is associated with a contact name identified in a contact list associated with the first user profile and not another user profile.

At block 614, the method 600 may include sending the message data in association with the first user profile based at least in part on the identifying the first user profile as the sender profile. The message data may include audio data representing a message captured by one or more microphones of the device. The message data may additionally, or alternatively, include text data corresponding to the audio data. Sending the message data may be performed over a network and between network interfaces as described herein.

The method 600 may also include causing one or more speakers of the device to output audio confirming that the message data is to be sent from the first user profile. In examples, the audio output by the one or more speakers may correspond to prerecorded speech and/or synthesized speech that provides an indication of the selected sender profile, the selected recipient profile, and/or the determined intent to send the message data in association with the first user profile and the recipient profile. For example, the audio output by the speakers of the device may correspond to a statement such as "sending a message from Alvin to Bob," which indicates to the user that the user's intent to send message data was acknowledged and that the message data will be sent in association with a user profile associated with Alvin and a user profile associated with Bob. This audio output by the speakers of the device may represent an implicit confirmation of the user's intent, the sender profile, and the recipient profile. Implicit confirmation may be in contrast to explicit confirmation, which may request that the user provide a confirmation that the selected profile is accurate and require an affirmative response before proceeding. In examples, only a portion of the information described herein may be output. For example, when a high confidence is associated with the sender profile being identified correctly, the audio output by the speakers of the device may not include a confirmation of the sender profile. In this example, the audio may correspond to a statement such as "sending message to Bob." In other examples, when a high confidence is associated with the recipient profile being identified correctly, the audio output by the speakers of the device may correspond to a statement such as "sending message from Alvin." In still other examples, when a high confidence is associated with the sender profile and the recipient profile being identified correctly, the audio may correspond to a statement such as "sending."

The method 600 may also include determining that a confidence level associated with determining the recipient profile is below a threshold confidence level. For example, the confidence level may correspond to a confidence score and be categorized as low confidence, mid confidence, or high confidence. The categorization of confidence scores may be done using a scale, such as 1 to 9, with confidence scores of 1 to 3 being categorized as low confidence, scores of 4 to 6 being categorized as mid confidence, and scores of 7 to 9 being categorized as high confidence. The threshold confidence level, in some examples may be associated with a confidence score of 3, or the top end of the low confidence level. The threshold confidence level may, alternatively, be associated with a confidence score of 6, or the top end of the mid confidence level. In other examples, the threshold confidence level may correspond to any confidence score. The threshold confidence level may be static or the confidence level may be dynamic, changing as feedback is provided by the user and/or as data is accumulated on interactions between the user and the device and/or between other users and the device. The method 600 may further include receiving, from the device, second audio data corresponding to second audio from the user. The second audio may represent the message data. Text data corresponding to the second audio data may be generated, such as by ASR techniques described herein.

The method 600 may further include analyzing the text data to confirm that the message data is to be associated with the recipient profile. This analysis may be based at least in part on the confidence level being below the threshold confidence level. For example, when the confidence level that the recipient profile was selected correctly is below the threshold confidence level, analysis of the message data may provide one or more indications that the selected recipient profile is either correct or incorrect. For example, the message data may include a word or phrase, such as a name, situated within a sentence in a way that indicates the sentence is directed to the named individual. This information may be used to confirm that the recipient profile was selected correctly. Other information from the message data may also be utilized, such as words or phrases indicating familial relationships. Additional information about the message data may also be utilized, such as the time of day and/or the day of the week that the message data is provided by the user.

The method 600 may also include identifying a name from the audio data and determining that the name corresponds to multiple contacts associated with the contact lists associated with the second information. Respective confidence scores may be assigned or otherwise associated with the multiple contact names based at least in part on historical data relating to message data sent between the multiple contact names and the first user profile. A highest confidence score may be identified from the multiple confidence scores and the recipient profile may be identified as the user profile corresponding to the contact name associated with the highest confidence score.

Figure 7:
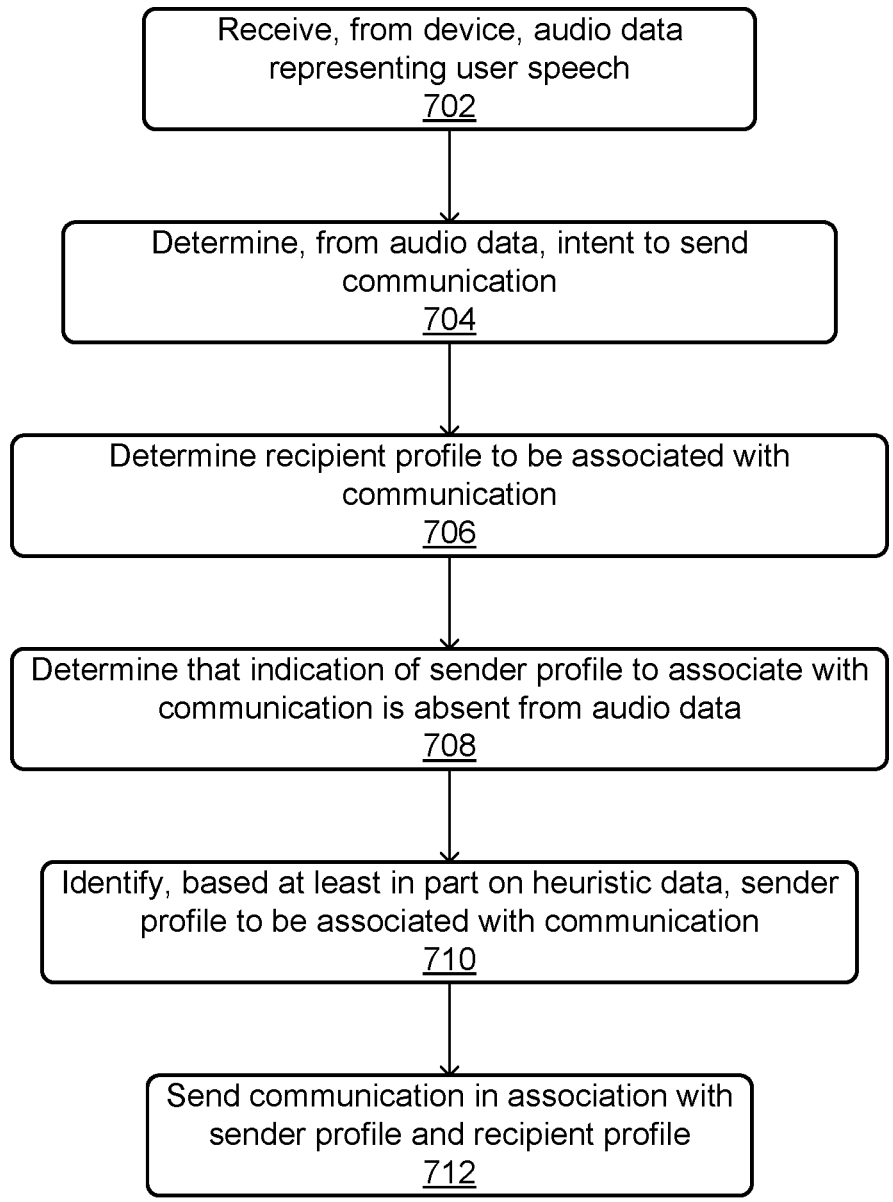
FIG. 7 illustrates a flow diagram of an example process for disambiguating the sender profile of a communication.

FIG. 7 illustrates a flow diagram of another example method 700 for disambiguating the sender profile of message data. The order in which the operations or steps are described is not intended to be construed as a limitation, and any number of the described operations may be combined in any order and/or in parallel to implement method 700.

At block 702, the method 700 may include receiving, from a device, audio data representing user speech. The user may speak, and that user speech may be captured by one or more microphones of the device. The one or more microphones may generate audio data corresponding to the user speech. The audio data may include the user speech and other components, such as, for example, background noise. The audio data corresponding to user speech may be received over a network. The network may represent an array of wired networks, wireless networks, such as WiFi, or combinations thereof. The audio data may be received at, for example, a remote system. In some instances, the remote system may be local to an environment associated the device. In some instances, some or all of the functionality of the remote system may be performed by the device. The method may include generating, via automatic speech recognition (ASR) performed on the audio data, text data corresponding to the audio data. For example, once the audio data is received from the device, the portion of the audio data corresponding to the user speech may be separated from other components of the audio data, such as, for example, background noise. ASR techniques may be used to determine words making up the user speech. For example, ASR techniques may include generation of a list that includes the most likely words or phrases spoken by the user, such as an "N-best list," and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings. Additional details regarding ASR techniques that may be used are described below with respect to FIG. 9.

At block 704, the method 700 may include determining an intent to send a communication. Determining the intent may be accomplished via natural language understanding performed on the text data, for example. For example, words and/or phrases making up the text data may be analyzed to determine intent. Generally, the NLU process takes textual input and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device, such as the device, to complete that action. For example, if a spoken utterance is processed using ASR and outputs the text "send a message to Bob" the NLU process may determine that the user intended that the device to capture speech of the user for sending, as an audio file, for output on a device of associated with "Bob." Additional details regarding the NLU process are provided with respect to FIG. 9, below.

At block 706, the method 700 may include determining a recipient profile to be associated with the communication. Determining the recipient profile may be accomplished via natural language understanding (NLU) performed on the text data. The NLU process may be similar to that described with respect to block 704. For example, if a spoken utterance is processed using ASR and outputs the text "send a message to Bob" the NLU process may determine that the user intended a user profile associated with "Bob" to be set as the recipient profile.

At block 708, the method 700 may include determining that an indication of a sender profile to associate with the communication is absent from the audio data and/or the text data. Determining that the audio data and/or the text data does not include an indication of the sender profile may be performed using NLU techniques. For example, once it is determined that the user intended to send a message, the audio data and/or the text data may be analyzed to identify the sender profile and the recipient profile. The recipient profile may be identified by determining a name and/or name indicator following a word that suggests the name and/or name indicator corresponds to the recipient profile. For example, user speech stating "send a message to Bob" includes the phrase "to Bob." The word "to" suggests that the name indicator, here "Bob," corresponds to the recipient profile. It should be understood that while this example describes the word "to" as an indicator of the user profile to set as the recipient profile, other words and/or permutations may be used, such as "directed at" and "directed to," for example. The sender profile may be identified by determining a name and/or name indicator following a word that suggests the name and/or name indicator corresponds to the sender profile. For example, user speech stating "send a message from Alvin" includes the phrase "from Alvin." The word "from" suggests that the name indicator, here "Alvin," corresponds to the sender profile. However, if the user speech does not contain a phrase such as that described herein that indicates the sender profile, then it may be determined that no indication of the sender profile has been provided by the user.

At block 710, the method 700 may include identifying, based at least in part on heuristic data, a sender profile to be associated with the communication. The heuristic data may include first information indicating that one or more user profiles associated with a device include only the first user profile. The heuristic data may additionally, or alternatively, include the first information indicating that the one or more user profiles associated with the device include only a first user profile and a second user profile corresponding to the recipient profile. The heuristic data may additionally, or alternatively, include second information indicating that contact information associated with the recipient profile is associated with a first contact list associated with the first user profile and the contact information is absent and/or not associated with a second contact list associated with the second user profile. The heuristic data may additionally, or alternatively, include first data indicating that contact information associated with the recipient profile is associated with a first contact list associated with the first user profile and a second contact list associated with a second user profile that is associated with the device, and second data indicating that at least one communication has been sent to the recipient profile only from the first user profile. In this example, even though the recipient is known by multiple users of the device, since only one of the users has communicated with the recipient using the device, the user profile associated with that user may be selected as the sender profile.

The heuristic data may additionally, or alternatively, include data indicating that previous communications were sent from the first user profile within a threshold amount of time of receiving the audio data. In this example, since the first user profile was recently set as the sender profile, it is likely that the same user is requesting to send another message from the device. The threshold amount of time may be a matter of seconds, minutes, and/or hours. The threshold amount of time may be static, such as, for example, 30 seconds, or the threshold amount of time may be dynamic and may be based at least in part on historical use data of the device, such as previous time gaps between messages sent from the same user profile. Additionally, or alternatively, the heuristic data may include an indication that the message is in reply to a previous message sent to the user and/or output by the device.

The heuristic data may additionally, or alternatively, include historical use data of a given device by a user in instances where the given device is associated with a set of devices. For example, multiple devices may be associated with each other based at least in part on, for example, their location within an environment, such as a home. One device may be located in an area of the environment used frequently by multiple users, such as a living room, while other devices may be located in areas of the environment used primarily by a given user, such as a bedroom. In examples, a device may be utilized by a given user more frequently than other users to send communications. Data indicating this utilization of the device may be used to select the user profile associated with that user as the sender profile. In other examples, the various devices of the set of devices may be predefined as being associated with a specific user profile, and that user profile may be set to the sender profile. Additionally, or alternatively, the sender profile may be identified based at least in part on identification of a predefined trigger expression accompanying the request to send a communication. For example, one or more trigger expressions may be assigned to one or more user profiles associated with the device. Detection of a trigger expression associated with a user profile may result in the user profile being identified as the sender profile. In examples, the heuristic data may additionally, or alternatively, include a speaker identification, a received signal strength indicator, and/or an image designated to correspond to a user. Additionally, or alternatively, the sender profile may be identified based at least in part on a schedule and/or calendar associated with the user profiles associated with the device. For example, if a user associated with a given user profile is scheduled to be away from the location where the device is situated at the time that the request to send a communication is received, that user profile may be excluded from consideration as the sender profile.

The heuristic data may also include data indicating that a signal is received from a personal device associated with the first user profile, at the device, that indicates the personal device is within a threshold proximity, such as within a home, to the device. This indication may also be based on pairing between the personal device and the device using, for example, Bluetooth technology.

The heuristic data described herein may be utilized independently or in combination. When utilized in combination, the results of utilizing the heuristic data may be used to raise an overall confidence level of identifying the sender and/or recipient profile correctly. In examples, the heuristic data may be utilized in a stepwise fashion until the sender and/or recipient profile are identified at or above a threshold level of confidence.

At block 712, the method 700 may include sending a communication in association with the sender profile and the recipient profile. The communication may include audio data representing a message captured by one or more microphones of the device. The communication may additionally, or alternatively, include text data corresponding to the audio data. Sending the communication may be performed over a network and between network interfaces as described herein.

The method 700 may also include causing one or more speakers of the device to output audio confirming that the communication is to be sent from the first user profile. In examples, the audio output by the one or more speakers may correspond to prerecorded speech and/or synthesized speech that provides an indication of the selected sender profile, the selected recipient profile, and/or the determined intent to send the communication in association with the first user profile and the recipient profile. For example, the audio output by the speakers of the device may correspond to a statement such as "sending a message from Alvin to Bob," which indicates to the user that the user's intent to send a communication was acknowledged and that the communication will be sent from a user profile associated with Alvin and to a user profile associated with Bob. This audio output by the speakers of the device may represent an implicit confirmation of the user's intent, the sender profile, and the recipient profile. In examples, only a portion of the information described herein may be output. For example, when a high confidence is associated with the sender profile being identified correctly, the audio output by the speakers of the device may not include a confirmation of the sender profile. In this example, the audio may correspond to a statement such as "sending message to Bob." In other examples, when a high confidence is associated with the recipient profile being identified correctly, the audio output by the speakers of the device may correspond to a statement such as "sending message from Alvin." In still other examples, when a high confidence is associated with the sender profile and the recipient profile being identified correctly, the audio may correspond to a statement such as "sending."

The method 700 may also include receiving, from the device, second audio data corresponding to second user speech from the user. The second audio may represent the communication. Text data corresponding to the second audio data may be generated, such as by ASR techniques described herein. The method 700 may further include analyzing the text data and/or the audio data to confirm that the communication is directed to the recipient profile. For example, the communication may include a name situated within a sentence in a way that indicates the communication is directed to the named individual. This information may be used to confirm that the recipient profile was selected correctly. Other information from the communication may also be utilized, such as words or phrases indicating familial relationships. Additional information about the communication may also be utilized, such as the time of day and/or the day of the week that the message data is provided by the user.

Figure 8:
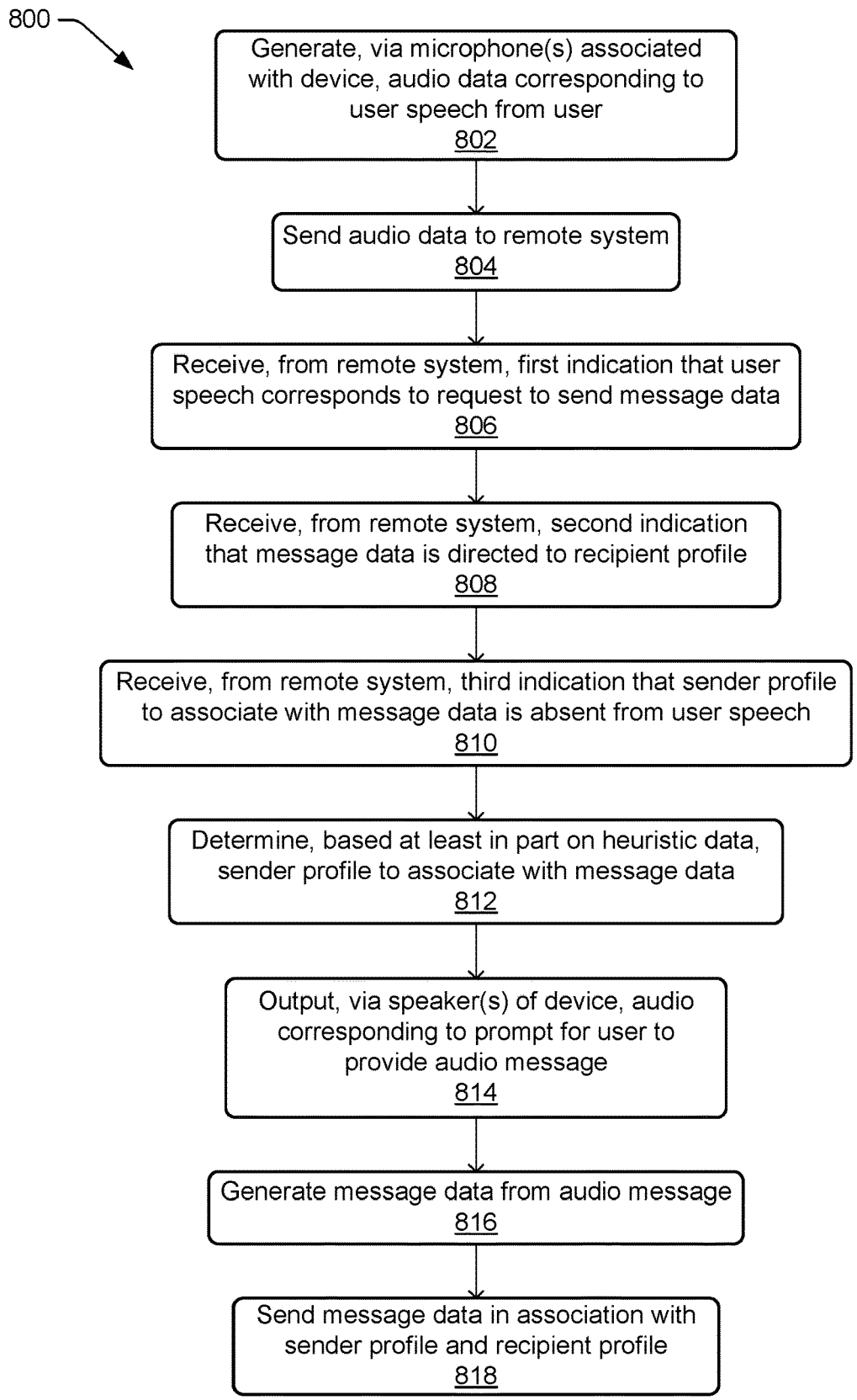
FIG. 8 illustrates a flow diagram of another example process for disambiguating the sender profile of message data.

FIG. 8 illustrates a flow diagram of another example method 800 for disambiguating the sender profile of message data. The order in which the operations or steps are described is not intended to be construed as a limitation, and any number of the described operations may be combined in any order and/or in parallel to implement method 800.

At block 802, the method 800 may include generating, via one or more microphones associated with a device, audio data corresponding to user speech from a user. The one or more microphones of the device may capture the user speech from the user, which may include user speech and background noise. The one or more microphones may generate the audio data from the captured user speech.

At block 804, the method 800 may include sending the audio data to a remote system. Sending the audio data may be performed over a network and between network interfaces as described herein. In some examples, instead of sending the audio data to a remote system, the audio data may be retained by the device and processed as described in the following operations.

At block 806, the method 800 may include receiving, from the remote system, a first indication that the user speech corresponds to a request to send message data. The first indication may be based at least in part on automatic speech recognition (ASR) and/or natural language understanding (NLU) techniques performed on the audio data at the remote system. For example, once the audio data is received at the remote system from the device, the portion of the audio data corresponding to the user speech may be separated from other components of the audio data, such as, for example, background noise. ASR techniques may be used to determine words making up the user speech. For example, ASR techniques may include generation of a list that includes the most likely words or phrases spoken by the user, such as an "N-best list," and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings. Additional details regarding ASR techniques that may be used are described below with respect to FIG. 9.

As to the NLU techniques, for example, words and/or phrases making up the text data may be analyzed to determine intent. Generally, the NLU process takes textual input and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device, such as the device, to complete that action. For example, if a spoken utterance is processed using ASR and outputs the text "send a message to Bob" the NLU process may determine that the user intended that the device to capture speech of the user for sending, as an audio file, for output on a device of associated with "Bob." Additional details regarding the NLU process are provided with respect to FIG. 9, below.

At block 808, the method 800 may include receiving, from the remote system, a second indication that the message data is directed to a recipient profile. The second indication may be based at least in part on NLU techniques performed on the text data, as described above. The NLU process may be similar to that described with respect to block 806. For example, if a spoken utterance is processed using ASR and outputs the text "send a message to Bob" the NLU process may determine that the user intended a user profile associated with "Bob" to be set as the recipient profile.

At block 810, the method 800 may include receiving, from the remote system, a third indication that a sender profile to associate with the message data is absent from the user speech. Determining that the user speech does not include an indication of the sender profile may be performed using NLU techniques. For example, once it is determined that the user intended to send a message, the audio data and/or the text data may be analyzed to identify the sender profile and the recipient profile. The recipient profile may be identified by determining a name and/or name indicator following a word that suggests the name and/or name indicator corresponds to the recipient profile. For example, user speech stating "send a message to Bob" includes the phrase "to Bob." The word "to" suggests that the name indicator, here "Bob," corresponds to the recipient profile. It should be understood that while this example describes the word "to" as an indicator of the user profile to set as the recipient profile, other words and/or permutations may be used, such as "directed at" and "directed to," for example. The sender profile may be identified by determining a name and/or name indicator following a word that suggests the name and/or name indicator corresponds to the sender profile. For example, user speech stating "send a message from Alvin" includes the phrase "from Alvin." The word "from" suggests that the name indicator, here "Alvin," corresponds to the sender profile. However, if the user speech does not contain a phrase such as that described herein that indicates the sender profile, then it may be determined that no indication of the sender profile has been provided by the user.

At block 812, the method 800 may include determining, based at least in part on heuristic data, a sender profile to associate with the message data. The heuristic data may include first information indicating that only a first user profile is associated with a device. The heuristic data may additionally, or alternatively, include the first information indicating that the only the first user profile and a second user profile corresponding to the recipient profile are associated with the device. The heuristic data may additionally, or alternatively, include second information indicating that contact information associated with the recipient profile is associated with only a first contact list associated with the first user profile. Additional information about the message data may also be utilized, such as the time of day and/or the day of the week that the message data is provided by the user.

The heuristic data may additionally, or alternatively, include data indicating that previous communications were sent from a first user profile within a threshold amount of time of receiving the audio data. In this example, since the first user profile was recently set as the sender profile, it is likely that the same user is requesting to send another message from the device. The threshold amount of time may be a matter of seconds, minutes, and/or hours. The threshold amount of time may be static, such as, for example, 30 seconds, or the threshold amount of time may be dynamic and may be based at least in part on historical use data of the device, such as previous time gaps between messages sent from the same user profile. Additionally, or alternatively, the sender profile may be identified based at least in part on identification of a predefined trigger expression accompanying the request to send a communication. For example, one or more trigger expressions may be assigned to one or more user profiles associated with the device. Detection of a trigger expression associated with a user profile may result in the user profile being identified as the sender profile.

The heuristic data may additionally, or alternatively, include historical usage data of a given device by a user in instances where the given device is associated with a set of devices. For example, multiple devices may be associated with each other based at least in part on, for example, their location within an environment, such as a home. One device may be located in an area of the environment used frequently by multiple users, such as a living room, while other devices may be located in areas of the environment used primarily by a given user, such as a bedroom. In examples, a device may be utilized by a given user more frequently than other users to send communications. Data indicating this utilization of the device may be used to select the user profile associated with that user as the sender profile.

At block 814, the method 800 may include outputting, via one or more speakers of the device, audio corresponding to a prompt for the user to provide an audio message. At this point in method 800, the sender's intent to send message data may be determined, and the sender and recipient profiles may also be determined. Having made these determinations, the one or more speakers of the device may output the second audio to prompt the user to provide the message that the user intends to send. The message may be an audio message that corresponds to user speech. Upon outputting the second audio corresponding to the prompt, the one or more microphones of the device may capture audio representing the user's response to the prompt. The user's response may correspond to the intended audio message.

At block 816, the method 800 may include generating message data from the audio message. The message data may be generated by, for example, the one or more microphones of the device generating audio data corresponding to the audio message provided by the user. Additionally, in some examples, text data representing a transcription of the audio data may be generated. The audio data and/or the text data may represent the message data.

At block 818, the method 800 may include sending the message data in association with the sender profile and the recipient profile. Sending the message data may be performed over a network and between network interfaces as described herein.

The method 800 may also include causing one or more speakers of the device to output audio confirming that the message data is to be sent in association with the first user profile. In examples, the audio output by the one or more speakers may correspond to prerecorded speech and/or synthesized speech that provides an indication of the selected sender profile, the selected recipient profile, and/or the determined intent to send the message data. For example, the audio output by the speakers of the device may correspond to a statement such as "sending a message from Alvin to Bob," which indicates to the user that the user's intent to send message data was acknowledged and that the message data will be send from a user profile associated with Alvin and to a user profile associated with Bob. This audio output by the speakers of the device may represent an implicit confirmation of the user's intent, the sender profile, and the recipient profile. The method 800 may also include determining that no response is received from the user within a set amount of time from outputting the audio data corresponding to the confirmation. The message data may be sent based at least in part on the determination that no response is received. In this example, the system, after providing confirmation of the user's intent, the sender profile, and the recipient, provides the user with the opportunity to provide a correction if any of the information is incorrect, such as the sender profile and/or the recipient profile being chosen incorrectly. In other examples, a response may be received from the user following output of the audio confirmation. The response from the user may indicate that the first user profile should not correspond to the sender profile. Based at least in part on this indication from the user, the first user profile may be excluded as a candidate profile for the sender profile and the heuristic data described herein may be performed again to identify the correct sender profile.

Figure 9:
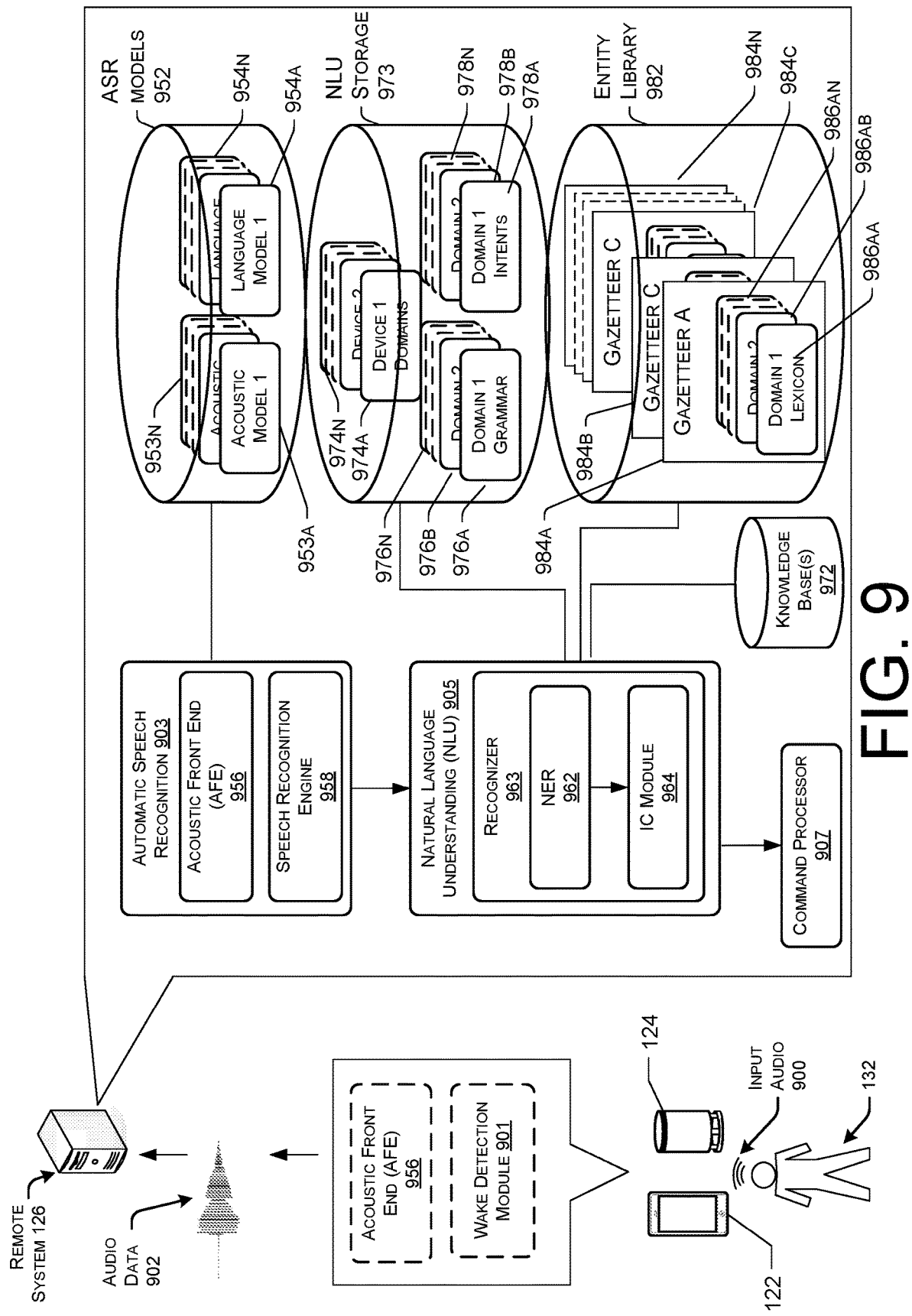
FIG. 9 illustrates a conceptual diagram of components of a speech processing system for processing audio data provided by one or more user devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 126). The various components illustrated may be located on a same or different physical devices. Communication between various components illustrated in FIG. 9 may occur directly or across a network 128. An audio capture component, such as a microphone 134 of the device 124, or another device, captures audio 900 corresponding to a spoken utterance. The device 122 or 124, using a wakeword detection module 901, then processes audio data corresponding to the audio 900 to determine if a keyword (such as a wakeword) is detected in the audio data. Following detection of a wakeword, the device sends audio data 902 corresponding to the utterance to the remote system 126 that includes an ASR module 903. The audio data 902 may be output from an optional acoustic front end (AFE) 956 located on the device prior to transmission. In other instances, the audio data 902 may be in a different form for processing by a remote AFE 956, such as the AFE 956 located with the ASR module 903 of the remote system 126.

The wakeword detection module 901 works in conjunction with other components of the user device, for example a microphone to detect keywords in audio 900. For example, the device may convert audio 900 into audio data, and process the audio data with the wakeword detection module 901 to determine whether speech is detected, and if so, if the audio data comprising speech matches an audio signature and/or model corresponding to a particular keyword.

The user device may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by user device (or separately from speech detection), the user device may use the wakeword detection module 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 124 may "wake" and begin transmitting audio data 902 corresponding to input audio 900 to the remote system 126 for speech processing. Audio data corresponding to that audio may be sent to remote system 126 for routing to a recipient device or may be sent to the remote system 126 for speech processing for interpretation of the included speech (either for purposes of enabling voice-communications and/or for purposes of executing a command in the speech). The audio data 902 may include data corresponding to the wakeword, or the portion of the audio data corresponding to the wakeword may be removed by the local device 124 prior to sending. Further, a local device may "wake" upon detection of speech/spoken audio above a threshold, as described herein. Upon receipt by the remote system 126, an ASR module 903 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 903 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing a time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 126 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 126, for natural language understanding (NLU) processing, such as conversion of the text into commands for execution, either by the user device, by the remote system 126, or by another device (such as a server running a specific application like a search engine, etc.).

The device performing NLU processing 905 (e.g., server 126) may include various components, including potentially dedicated processor(s), memory, storage, etc. As shown in FIG. 9, an NLU component 905 may include a recognizer 963 that includes a named entity recognition (NER) module 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 903 based on the utterance input audio 900) and attempts to make a semantic interpretation of the text. That is, the NLU process determines the meaning behind the text based on the individual words and then implements that meaning. NLU processing 905 interprets a text string to derive an intent or a desired action from the user as well as the pertinent pieces of information in the text that allow a device (e.g., device 124) to complete that action. For example, if a spoken utterance is processed using ASR 903 and outputs the text "send a message to Joe: Hi Joe, Congratulations . . . " the NLU process may determine that the user intended that the user device capture speech of the user for sending, as an audio file, for output on a device of "Joe."

The NLU may process several textual inputs related to the same utterance. For example, if the ASR 903 outputs N text segments (as part of an N-best list), the NLU may process all N outputs to obtain NLU results.

As will be discussed further below, the NLU process may be configured to parsed and tagged to annotate text as part of NLU processing. For example, for the text "Send a message to Joe," "send a message" may be tagged as a command (to generate an audio file and send it for output) and "to Joe" may be tagged as a specific entity associated with the command.

To correctly perform NLU processing of speech input, an NLU process 905 may be configured to determine a "domain" of the utterance so as to determine and narrow down which services offered by the endpoint device (e.g., remote system 126 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 962 receives a query in the form of ASR results and attempts to identify relevant grammars and lexical information that may be used to construe meaning. To do so, the NLU module 905 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) module 964 parses the query to determine an intent or intents for each identified domain, where the intent corresponds to the action to be performed that is responsive to the query. Each domain is associated with a database (978*a*-978*n*) of words linked to intents. For example, a music intent database may link words and phrases such as "quiet," "volume off," and "mute" to a "mute" intent. A voice-message intent database, meanwhile, may link words and phrases such as "send a message," "send a voice message," "send the following," or the like. The IC module 964 identifies potential intents for each identified domain by comparing words in the query to the words and phrases in the intents database 978. In some instances, the determination of an intent by the IC module 964 is performed using a set of rules or templates that are processed against the incoming text to identify a matching intent.

In order to generate a particular interpreted response, the NER 962 applies the grammar models and lexical information associated with the respective domain to actually recognize a mention one or more entities in the text of the query. In this manner, the NER 962 identifies "slots" (i.e., particular words in query text) that may be needed for later command processing. Depending on the complexity of the NER 962, it may also label each slot with a type of varying levels of specificity (such as noun, place, city, artist name, song name, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (976) framework or frameworks may correspond to sentence structures such as "Send a message to {contact}," "Send a voice message to {contact}," "Send the following to {contact}," etc.

For example, the NER module 962 may parse the query to identify words as subject, object, verb, preposition, etc., based on grammar rules and/or models, prior to recognizing named entities. The identified verb may be used by the IC module 964 to identify intent, which is then used by the NER module 962 to identify frameworks. A framework for the intent of "send a message," meanwhile, may specify a list of slots/fields applicable to play the identified "contact" and any object modifier (e.g., specifying a device of the recipient) or the like. The NER module 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 962 may search the database of generic words associated with the domain (in the knowledge base 972). So, for instance, if the query was "send message to Joe," after failing to determine a last name for "Joe," the NER component 962 may search the domain vocabulary for the word "Joe." In the alternative, generic words may be checked before the gazetteer information, or both may be tried, potentially producing two different results.

The output data from the NLU processing (which may include tagged text, commands, etc.) may then be sent to a command processor 907. The destination command processor 907 may be determined based on the NLU output. For example, if the NLU output includes a command to send a message, the destination command processor 907 may be a message sending application, such as one located on the user device or in a message sending appliance, configured to execute a message sending command. If the NLU output includes a search request, the destination command processor 907 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 905 during runtime operations where NLU operations are performed on text (such as text output from an ASR component 903). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC module 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 126 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 126, as illustrated herein are exemplary, and may be located in a stand-alone device or may be included, in whole or in part, as a component of a larger device or system, may be distributed across a network or multiple devices connected by a network, etc.

Figure 10:
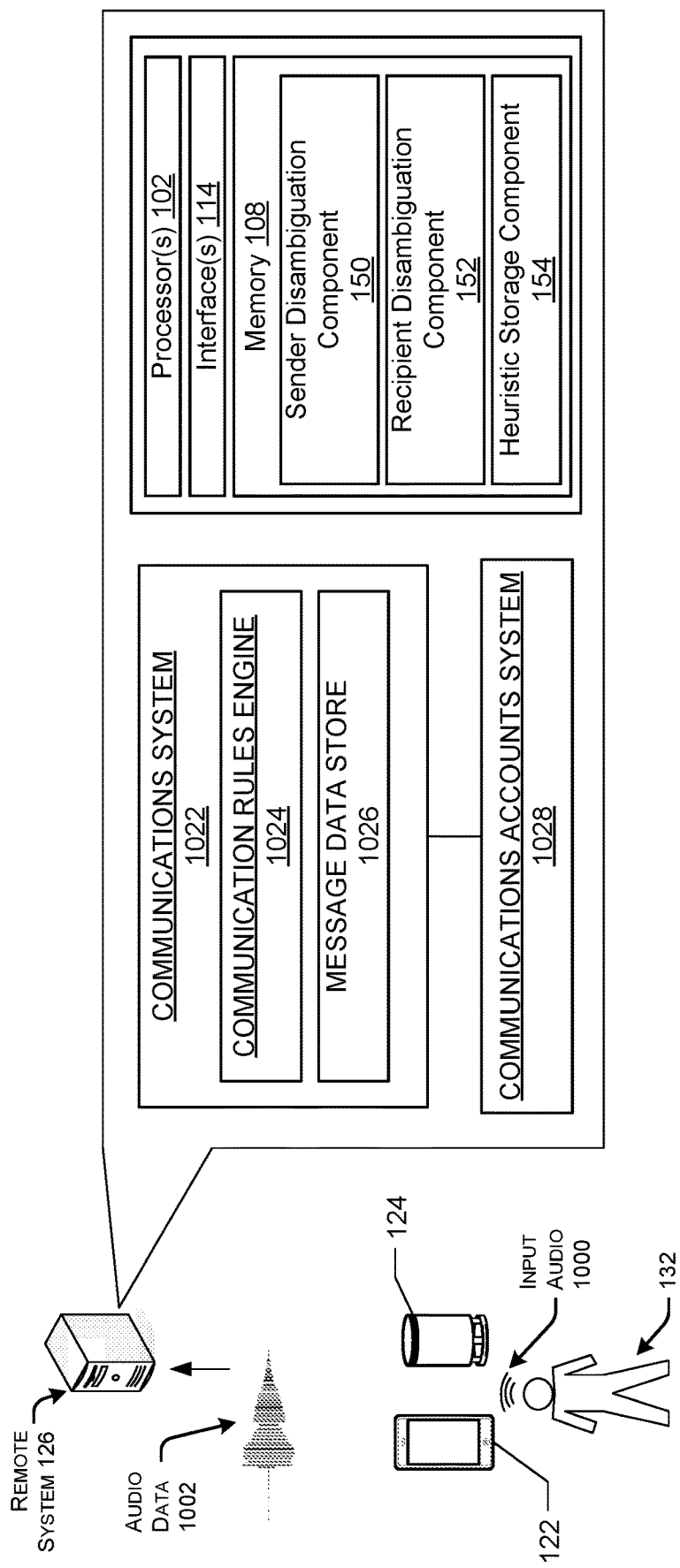
FIG. 10 illustrates a conceptual diagram of components of a communications system for sender and/or recipient disambiguation and message data transfer.

FIG. 10 illustrates a conceptual diagram of components of a communications system for sender and/or recipient disambiguation and message data transfer. An audio capture component, such as a microphone 134 of the device 124, or another device, captures audio 1000 corresponding to a spoken utterance. The device 122 or 124 sends audio data 1002 corresponding to the utterance to the remote system 126. The remote system 126 and/or one or more of devices 120, 122, or 124 may include, in a non-limiting embodiment, a communications system 1022, which may be configured to facilitate communications between two or more electronic devices. For example, communications system 1022 may be capable of facilitating a communications session between device 124 and at least device 122. Upon the remote system 126 determining that an intent of an utterance is for a communications session to be established with another device and/or for message data to be sent to and/or received from another device, the remote system 126 may access communications system 1022 to facilitate the communications session between the initiating device and the receiving device. For example, communications system 1022 may employ Voice over Internet Protocol (VoIP) functionality to facilitate audio, image, and/or text data communications between the initiating device and the recipient device.

As an illustrative example, a communications session between two devices is described below to illustrate how the communications session may be established. In one example embodiment, an individual may speak an utterance (e.g., "Alexa, send a message to John: 'Want to have dinner at my place?'") to their electronic device. In response to detecting the device's wakeword (e.g., "Alexa"), the electronic device may begin sending audio data representing the utterance to the remote system 126. Upon receipt, automatic speech recognition may be performed, such as speech-to-text processing, to the audio data to generate text data representing the audio data. Natural language understanding techniques, as described with respect to FIG. 9, may be performed to determine an intent of the utterance. If the format of the spoken utterance substantially matches one or more sample utterances corresponding to initiating a communications session, then that may indicate that an intent of the utterance was for a communications session to be initiated. For instance, one example sample utterance may be "{Wakeword}, send a message to {Contact Name}: {Message}." If the spoken utterance's text data substantially matches this sample utterance's framework, then the remote system 126 may determine that the intent of the utterance was to start a communications session with a contact of the user, and may also determine that the intended target of the communications session is "John" (e.g., {Contact Name}: John). After determining that a message is to be sent to a contact named "John," communications system 1022 may access communications accounts system 1028 to determine a device identifier (e.g., a device address) associated with the contact, "John."

In some embodiments, communications system 1022 may establish a communications session between an initiating device and a recipient device using one or more VoIP protocols including, but not limited to SIP, RTP, RTCP, SRTP, and SDP. In one illustrative embodiment, a SIP signaling command may be provided to communications system 1022 for communicating with the recipient device. In particular, PJSIP functionality adds a new "user-to-user" header that indicates the device pair for the communications session.

In one embodiment, communications system 1022 may include a communication rules engine 1024. Communications rules engine 1024 may store various rules for how certain communications between communal accounts and user accounts are to behave. For example, communications rules engine 1024 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. In one illustrative embodiment, communication rules engine 1024 may store a communications table indicating various device identifiers, group account identifiers, communication identifiers, and device types for various devices interacting with communications system 1022.

In some embodiments, communications system 1022 may also include a message data store 1026. Message data store 1026, in a non-limiting embodiment, may correspond to any suitable type of storage/memory capable of storing one or more messages sent/received. For example, when an individual sends a message (e.g., "Want to have dinner at my place?") from their communal device to another communal device, that message may be stored by communications system 1022 using message data store 1026. In some embodiments, message data store 1026 may be structured to store audio data representing audio message, video data representing video messages, image data representing image messages, text data representing text messages, and/or message notification metadata. When an individual utters a request to receive messages received for their user account and/or communal account, communications system 1022 may access message data store 1026 to obtain those messages, and may send the appropriate message data (e.g., audio, video, image, text, etc.) to the corresponding requesting device (e.g., personal device, communal device). In some embodiments, message data store 1026 may store each message with a corresponding communications identifier, communal account identifier, user account identifier, and/or device identifier with which that message is directed to. For example, if a first individual sends an audio message to a second individual, audio data representing that audio message may be stored by message data store 1026 with a communal account identifier associated with the second individual's corresponding communal account, as stored by communications accounts system 1028. This way, when an individual requests to receive messages associated with their communal account, message data store 1026 may be accessed to obtain any messages currently stored thereby that are associated with that communal account's communal account identifier.

Communications rules engine 1024 may employ several communications rules for messages sent/received to/from one or more participants. First, a device type of the sending device may be determined. For example, a determination may be made as to whether or not a device identifier associated with the device that the audio data representing an utterance, which includes a message to be sent to another individual's device, is associated with a communal device. Next, a determination may be made as to whether or not a speaker that spoke the utterance was able to be identified. Using these two parameters, for instance, communications rules engine 1024 may be configured to cause communications system 1022 to facilitate communications between two or more devices. In instances where the recipient and/or sender profile could not be expressly identified, heuristic data as described herein may be utilized.

Communications accounts system 1028 may also store one or more communal accounts corresponding to one or more shared devices. For example, a communal device, such as device 124, may have its own communal account stored on communications accounts system 1028. The communal account may be associated with the communal device, and may also be linked to one or more individual's user accounts and/or profiles. For example, communal device 124 may be associated with a first communal account corresponding to a first grouping of individuals (e.g., a family). One or more user accounts may also be associated with the first communal account (e.g., individual members of the family), corresponding to individuals that may be capable of interacting with communal electronic device 124. Information, settings, and/or preferences, for example, for each user account may be stored within a user account database.

The remote system 126 may also include one or more components utilized to perform sender and/or recipient profile disambiguation and confirmation as described here. For example, the remoter system 126 may include one or more processors 102, one or more network interfaces 114, and memory 108, all of which are described above with respect to FIG. 1. The memory 108 may include components that are utilized to perform sender and/or recipient profile disambiguation. For example, the memory 108 may include a sender disambiguation component 150 which may utilize heuristic data to select a user profile to set as a sender profile, such as when an indication of the sender profile is not provided by the user or when the indication provided by the user leads to selection of the sender profile at a low degree of confidence. Example functionality of the sender disambiguation component 150 is provided above with respect to FIG. 2.

The memory 108 may additionally, or alternatively, include a recipient disambiguation component 152, which may utilize the same or different heuristic data as that described with respect to the sender disambiguation component 150 to select a user profile to set as a recipient profile. The recipient disambiguation component 152 may be utilized when, for example, the user has not provided an indication of the recipient profile or when the user's indication provided by the user leads to selection of the recipient profile at a low degree of confidence.

The memory 108 may additionally, or alternatively, include a heuristic storage component 154. The heuristic storage component may store, for example, some or all of the heuristic data described herein as being utilized to identify a sender and/or recipient profile to associate with a communication and/or message data. The heuristic storage component may store message history data, including historical data of sent messages and the related sender and recipient profiles. In instances where the sender and/or recipient profile are not selected from the user speech provided by the user, the sender disambiguation component 150 and/or the recipient disambiguation component 152 may communicate with the heuristic storage component 154 to receive heuristic data to be utilized in identifying the sender and/or recipient user profiles.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   non-transitory computer-readable media storing instructions that, when executed by the one or more processors, causes the one or more processors to perform operations comprising:
   receiving audio data representing user speech;
   determining intent data representing the audio data, the intent data indicating a request to send a communication;
   determining a recipient profile to be associated with the communication;
   identifying, utilizing the audio data and based at least in part on heuristic data associated with the audio data, a first sender profile of user profiles associated with a communal device, wherein the first sender profile is to be associated with the communication when a sender profile identifier is absent from the audio data; and
   sending the communication in association with the first sender profile and to the recipient profile.

2. The system of claim 1, the operations further comprising:
   determining account data associated with the communal device;
   identifying, utilizing the account data, heuristic datasets associated with the communal device; and
   identifying the heuristic data from the heuristic datasets.

3. The system of claim 1, the operations further comprising:
   storing first data representing a first voice signature as spoken by a first user associated with the communal device, the first user associated with the first sender profile; and
   determining that a second voice signature of the audio data corresponds to the first voice signature, wherein the heuristic data indicates that the first sender profile is to be identified based at least in part on the second voice signature corresponding to the first voice signature.

4. The system of claim 1, the operations further comprising:
storing first data representing a first voice signature as spoken by a first user associated with the communal device, the first user associated with the first sender profile;
storing second data representing a second voice signature as spoken by a second user associated with the communal device, the second user associated with a second sender profile; and
determining that a third voice signature of the audio data corresponds to the first voice signature instead of the second voice signature, wherein the heuristic data indicates that the first sender profile is to be identified based at least in part on the third voice signature corresponding to the first voice signature instead of the second voice signature.

5. The system of claim 1, the operations further comprising:
associating the heuristic data with the first sender profile;
associating additional heuristic data with a second sender profile, the additional heuristic data differing from the heuristic data; and
determining that the user speech is associated with the heuristic data instead of the additional heuristic data.

6. The system of claim 1, the operations further comprising:
identifying, utilizing the audio data, a user identifier of a person that provided the user speech; and
determining that the user identifier is associated with the first sender profile, wherein the heuristic data indicates that the first sending profile is to be identified based at least in part on the user identifier being associated with the first sender profile.

7. The system of claim 1, the operations further comprising determining, utilizing scheduling data associated with the communal device, that, at a time when the audio data is received, the first sender profile is unassociated with a scheduled event having a location that differs from where the communal device is situated, wherein the heuristic data indicates that the first sender profile is to be identified based at least in part on determining that the first sender profile is unassociated with the scheduled event.

8. The system of claim 1, the operations further comprising:
receiving an indication that the communal device, at a time when the audio data is received, is in communication with a device; and
determining that a device identifier of the device is associated with the first sender profile wherein the heuristic data indicates that the first sender profile is to be identified based at least in part on determining that the device identifier is associated with the first sender profile.

9. The system of claim 1, the operations further comprising determining that a first characteristic of the audio data corresponds to a second characteristic of prior audio data associated with a prior communication, the prior communication being sent in association with the sender profile, wherein the heuristic data indicates that the first sender profile is to be identified based at least in part on the first characteristic corresponding to the second characteristic.

10. The system of claim 1, the operations further comprising:
determining a confidence value associated with sending the communication in association with a selected sender profile; and
determining that the confidence value does not satisfy a threshold confidence value, wherein the heuristic data indicates that the first sender profile is to be identified based at least in part on the confidence value not satisfying the threshold confidence value.

11. A method comprising:
receiving audio data representing user speech;
determining intent data representing the audio data, the intent data indicating a request to send a communication;
determining a recipient profile to be associated with the communication;
identifying, utilizing the audio data and based at least in part on heuristic data associated with the audio data, a first sender profile of user profiles associated with a communal device, wherein the first sender profile is to be associated with the communication when a sender profile identifier is absent from the audio data; and
sending the communication in association with the first sender profile and to the recipient profile.

12. The method of claim 11, further comprising:
determining account data associated with the communal device;
identifying, utilizing the account data, heuristic datasets associated with the communal device; and
identifying the heuristic data from the heuristic datasets.

13. The method of claim 11, further comprising:
storing first data representing a first voice signature as spoken by a first user associated with the communal device, the first user associated with the first sender profile; and
determining that a second voice signature of the audio data corresponds to the first voice signature, wherein the heuristic data indicates that the first sender profile is to be identified based at least in part on the second voice signature corresponding to the first voice signature.

14. The method of claim 11, further comprising:
storing first data representing a first voice signature as spoken by a first user associated with the communal device, the first user associated with the first sender profile;
storing second data representing a second voice signature as spoken by a second user associated with the communal device, the second user associated with a second sender profile; and
determining that a third voice signature of the audio data corresponds to the first voice signature instead of the second voice signature, wherein the heuristic data indicates that the first sender profile is to be identified based at least in part on the third voice signature corresponding to the first voice signature instead of the second voice signature.

15. The method of claim 11, further comprising:
associating the heuristic data with the first sender profile;
associating additional heuristic data with a second sender profile, the additional heuristic data differing from the heuristic data; and
determining that the user speech is associated with the heuristic data instead of the additional heuristic data.

16. The method of claim 11, further comprising:
identifying, utilizing the audio data, a user identifier of a person that provided the user speech; and
determining that the user identifier is associated with the first sender profile, wherein the heuristic data indicates that the first sending profile is to be identified based at least in part on the user identifier being associated with the first sender profile.

17. The method of claim 11, further comprising determining, utilizing scheduling data associated with the communal device, that, at a time when the audio data is received, the first sender profile is unassociated with a scheduled event having a location that differs from where the communal device is situated, wherein the heuristic data indicates that the first sender profile is to be identified based at least in part on determining that the first sender profile is unassociated with the scheduled event.

18. The method of claim 11, further comprising:
receiving an indication that the communal device, at a time when the audio data is received, is in communication with a device; and
determining that a device identifier of the device is associated with the first sender profile wherein the heuristic data indicates that the first sender profile is to be identified based at least in part on determining that the device identifier is associated with the first sender profile.

19. The method of claim 11, further comprising determining that a first characteristic of the audio data corresponds to a second characteristic of prior audio data associated with a prior communication, the prior communication being sent in association with the sender profile, wherein the heuristic data indicates that the first sender profile is to be identified based at least in part on the first characteristic corresponding to the second characteristic.

20. The method of claim 11, further comprising:
determining a confidence value associated with sending the communication in association with a selected sender profile; and
determining that the confidence value does not satisfy a threshold confidence value, wherein the heuristic data indicates that the first sender profile is to be identified based at least in part on the confidence value not satisfying the threshold confidence value.

* * * * *